(12) United States Patent
Ikeda

(10) Patent No.: US 12,711,749 B2
(45) Date of Patent: Aug. 18, 2026

(54) LEARNING APPARATUS, ESTIMATION APPARATUS, LEARNING METHOD, ESTIMATION METHOD, AND PROGRAM AND NON-TRANSITORY STORAGE MEDIUM

(71) Applicant: NEC Corporation, Tokyo (JP)

(72) Inventor: Hiroo Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 457 days.

(21) Appl. No.: 18/275,791

(22) PCT Filed: Sep. 29, 2021

(86) PCT No.: PCT/JP2021/035782
§ 371 (c)(1),
(2) Date: Aug. 3, 2023

(87) PCT Pub. No.: WO2023/053249
PCT Pub. Date: Apr. 6, 2023

(65) Prior Publication Data
US 2024/0119711 A1 Apr. 11, 2024

(51) Int. Cl.
*G06V 10/776* (2022.01)
*G06T 7/73* (2017.01)
(Continued)

(52) U.S. Cl.
CPC .............. *G06V 10/776* (2022.01); *G06T 7/73* (2017.01); *G06V 10/764* (2022.01);
(Continued)

(58) Field of Classification Search
CPC ...... G06V 10/776; G06V 20/70; G06V 40/10; G06V 10/82; G06V 10/774; G06V 10/764;
(Continued)

(56) References Cited

U.S. PATENT DOCUMENTS

2020/0074671 A1* 3/2020 Tseng ........................ G06T 7/73
2020/0193211 A1 6/2020 Guo et al.

FOREIGN PATENT DOCUMENTS

CN 108647639 A * 10/2018 ........... G06F 18/253
CN 108764065 A * 11/2018 ........... G06F 18/214
(Continued)

OTHER PUBLICATIONS

Extended European Search Report for EP Application No. EP21959297.9 dated on Mar. 22, 2024.
(Continued)

*Primary Examiner* — Pinalben Patel
(74) *Attorney, Agent, or Firm* — Sughrue Mion, PLLC

(57) ABSTRACT

The present invention provides a learning apparatus (10) including an acquisition unit (11) that acquires learning data associating a training image including a person with a correct answer label indicating a position of each person, a correct answer label indicating whether each of a plurality of keypoints of a body of each of the persons is visible in the training image, and a correct answer label indicating a position, within the training image, of the keypoint being
(Continued)

visible in the training image among a plurality of the keypoints, and a learning unit (12) that learns, based on the learning data, an estimation model.

18 Claims, 25 Drawing Sheets

(51) Int. Cl.

| | |
|---|---|
| ***G06V 10/764*** | (2022.01) |
| ***G06V 10/774*** | (2022.01) |
| ***G06V 10/82*** | (2022.01) |
| ***G06V 20/70*** | (2022.01) |
| ***G06V 40/10*** | (2022.01) |

(52) U.S. Cl.

CPC ............ *G06V 10/774* (2022.01); *G06V 10/82* (2022.01); *G06V 20/70* (2022.01); *G06V 40/10* (2022.01); *G06T 2207/10024* (2013.01); *G06T 2207/20081* (2013.01); *G06T 2207/20084* (2013.01); *G06T 2207/30196* (2013.01)

(58) Field of Classification Search

CPC ............. G06T 7/73; G06T 2207/10024; G06T 2207/20081

See application file for complete search history.

(56) References Cited

FOREIGN PATENT DOCUMENTS

| | | | | | |
|---|---|---|---|---|---|
| CN | 116051873 | A | * | 5/2023 | ........... G06V 10/757 |
| JP | 2004-295436 | A | | 10/2004 | |
| JP | 2016206795 | A | * | 12/2016 | |
| JP | 2019-091138 | A | | 6/2019 | |
| JP | 2020-098603 | A | | 6/2020 | |
| JP | 2020-525959 | A | | 8/2020 | |
| JP | 2020123105 | A | * | 8/2020 | |
| JP | 2021-033395 | A | | 3/2021 | |
| JP | 2024083602 | A | * | 6/2024 | ........... G06V 10/764 |
| WO | 2018/058419 | A1 | | 4/2018 | |
| WO | 2020/217812 | A1 | | 10/2020 | |

OTHER PUBLICATIONS

Cheng Yu et al: "Occlusion-Aware Networks for 3D Human Pose Estimation in Video", 2019 IEEE/CVF International Conference on Computer Vision (ICCV), IEEE, Oct. 27, 2019 (Oct. 27, 2019), pp. 723-732, XP033723978, DOI: 10.1109/ICCV.2019.00081.

Justin Wang et al: "3D Pose Detection in Videos: Focusing on Occlusion", arxiv.org, Cornell University Library, 201 Olin Library Cornell University Ithaca, NY 14853, Jun. 24, 2020 (Jun. 24, 2020), XP081709070.

Zhao Lin et al: "Perceiving heavily occluded human poses by assigning unbiased score", Information Sciences, Elsevier, Amsterdam, NL, vol. 537, May 30, 2020 (May 30, 2020), pp. 284-301, XP086228089, ISSN: 0020-0255, DOI: 10.1016/J.INS.2020.05.083.

International Search Report for PCT Application No. PCT/JP2021/035782, mailed on Dec. 14, 2021.

Xingyi Zhou et al., "Objects as Points", [Online], filing date Apr. 16, 2019, search date Apr. 23, 2021, https://arxiv.org/abs/1904.07850.

JP Office Communication for JP Application No. 2024-066640, mailed on Feb. 4, 2025 with English Translation.

Kinoshita Koichi, Murase Hiroshi, "Layered Parts Score Map Integration for Partially Occluded Humans Detection", an image lab, Japan, Japan Industrial Publishing Co., Ltd., Dec. 10, 2013, vol. 24, No. 12, and pp. 54-60.

Lingfei Zhu et al., "Human Pose Estimation Based on Deep Neural Network", 2018 International Conference on Audio, and Language and Image Processing (ICALIP), the U.S., IEEE, Jul. 16, 2018, pp. 90-96.

* cited by examiner

FIG. 3

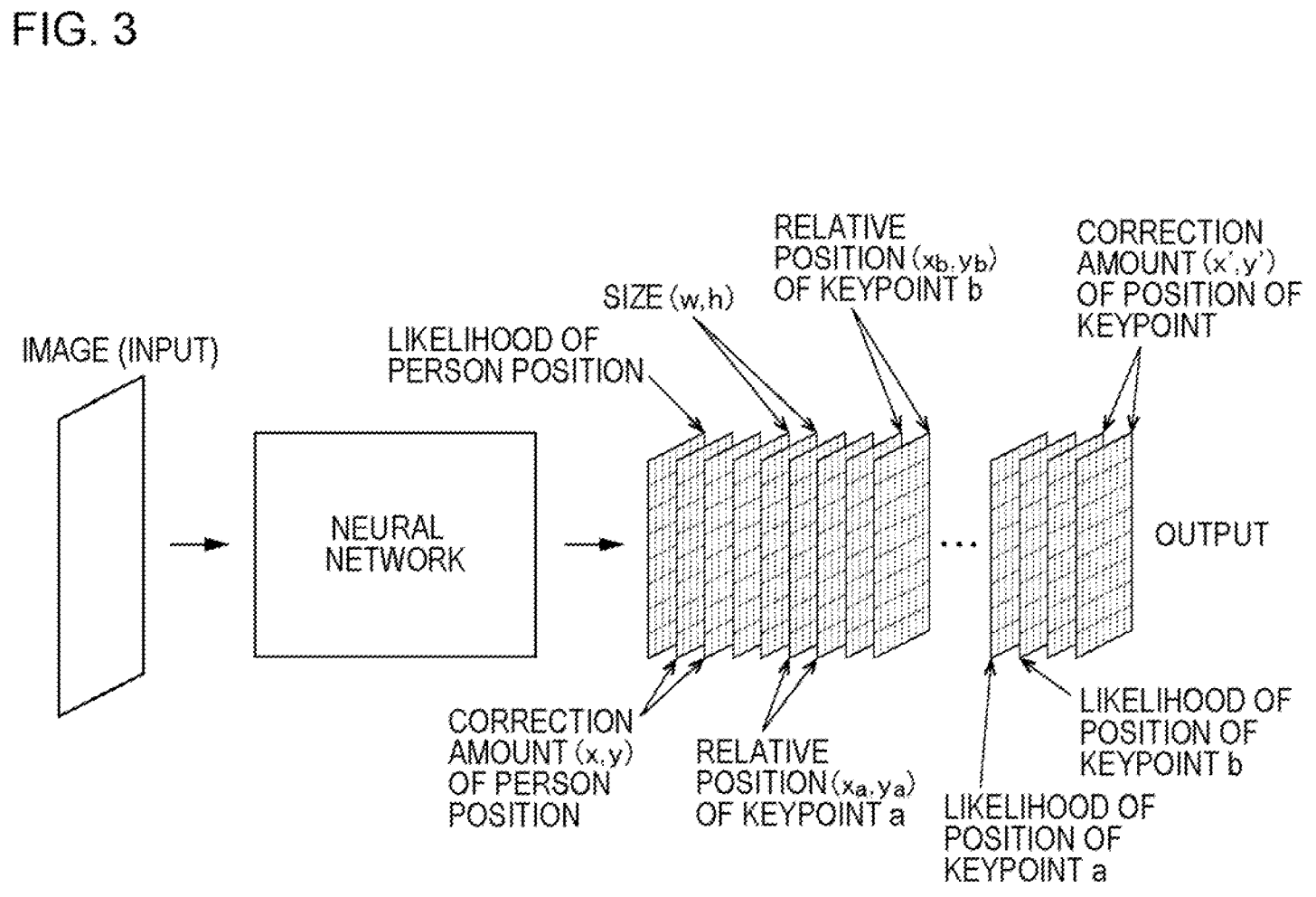

IMAGE (INPUT)

NEURAL NETWORK

LIKELIHOOD OF PERSON POSITION

SIZE (w,h)

RELATIVE POSITION $(x_b, y_b)$ OF KEYPOINT b

CORRECTION AMOUNT (x′,y′) OF POSITION OF KEYPOINT

OUTPUT

LIKELIHOOD OF POSITION OF KEYPOINT b

LIKELIHOOD OF POSITION OF KEYPOINT a

RELATIVE POSITION $(x_a, y_a)$ OF KEYPOINT a

CORRECTION AMOUNT (x,y) OF PERSON POSITION

LIKELIHOOD OF PERSON POSITION (CENTER POSITION)
CORRECTION AMOUNT (x) OF PERSON POSITION
CORRECTION AMOUNT (y) OF PERSON POSITION
SIZE (w)
SIZE (h)
RELATIVE POSITION (x_a) OF KEYPOINT a
RELATIVE POSITION (y_a) OF KEYPOINT a
RELATIVE POSITION (x_b) OF KEYPOINT b
RELATIVE POSITION (y_b) OF KEYPOINT b

FIG. 8

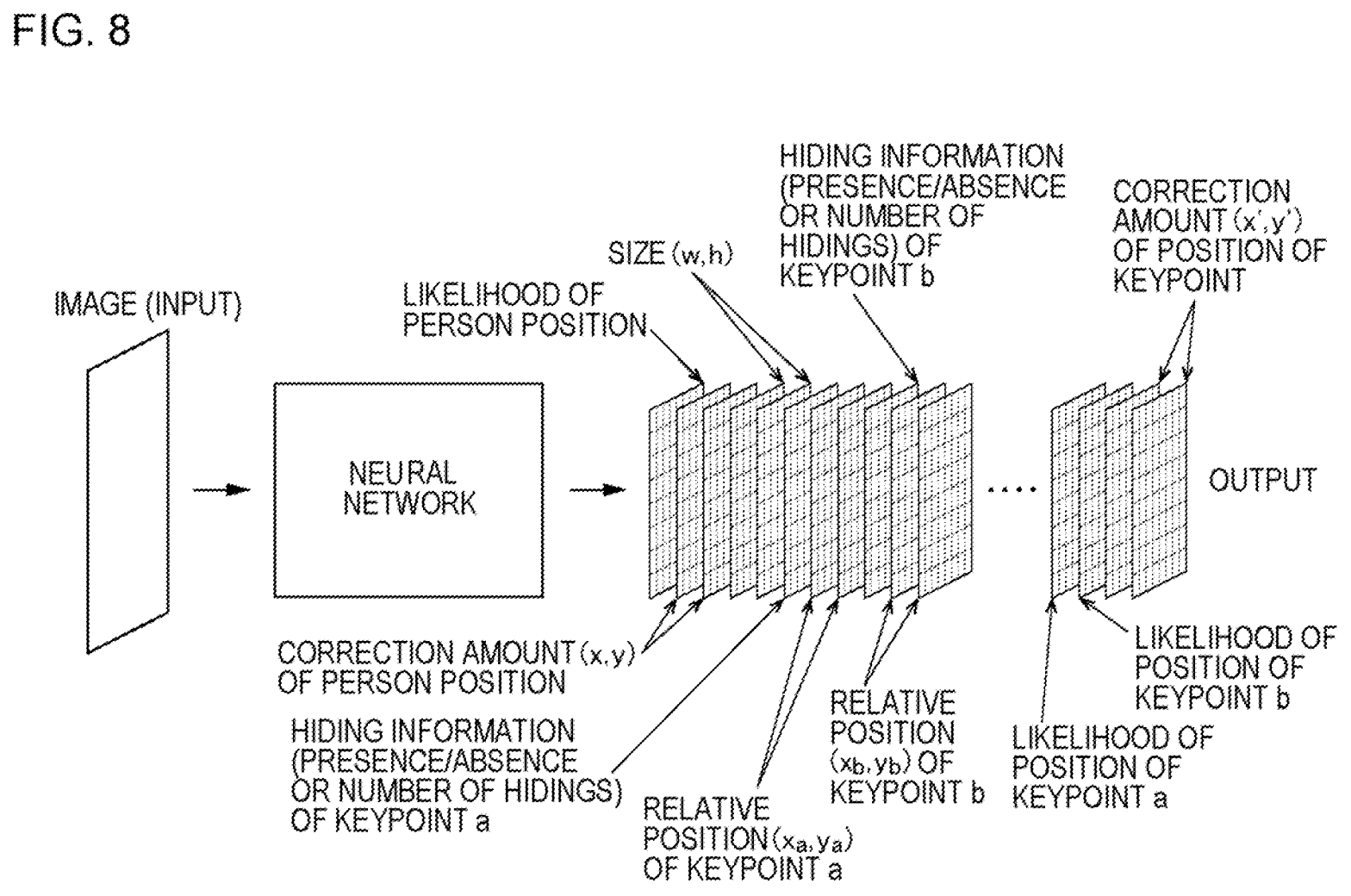

IMAGE (INPUT)

NEURAL NETWORK

LIKELIHOOD OF PERSON POSITION

SIZE (w,h)

CORRECTION AMOUNT (x,y) OF PERSON POSITION

HIDING INFORMATION (PRESENCE/ABSENCE OR NUMBER OF HIDINGS) OF KEYPOINT a

RELATIVE POSITION $(x_a, y_a)$ OF KEYPOINT a

HIDING INFORMATION (PRESENCE/ABSENCE OR NUMBER OF HIDINGS) OF KEYPOINT b

RELATIVE POSITION $(x_b, y_b)$ OF KEYPOINT b

....

CORRECTION AMOUNT (x',y') OF POSITION OF KEYPOINT

LIKELIHOOD OF POSITION OF KEYPOINT a

LIKELIHOOD OF POSITION OF KEYPOINT b

OUTPUT

FIG. 21

Start

ACQUIRE PROCESSING IMAGE S20

ESTIMATE BY USING ESTIMATION MODEL S21

OUTPUT ESTIMATION RESULT S22

End

LEARNING APPARATUS, ESTIMATION APPARATUS, LEARNING METHOD, ESTIMATION METHOD, AND PROGRAM AND NON-TRANSITORY STORAGE MEDIUM

This application is a National Stage Entry of PCT/JP2021/035782 filed on Sep. 29, 2021, the contents of all of which are incorporated herein by reference, in their entirety.

TECHNICAL FIELD

The present invention relates to a learning apparatus, an estimation apparatus, a learning method, an estimation method, and a program.

BACKGROUND ART

Patent Document 1 and Non-Patent Document 1 each disclose a technique for extracting a keypoint of a body of a person from an image by using a learned model.

According to the technique according to Patent Document 1, when an image in which a part of a body is hidden behind another obstruction and invisible is provided as learning data, positional information of a keypoint of the invisible part is also given as correct answer data. It is described that, in this way, a keypoint being hidden by another obstruction and invisible also becomes detectable.

The technique according to Non-Patent Document 1 configures a neural network that outputs, for a map acquired by dividing an image into a lattice shape, a map indicating a position of a person (a center position of a person) as a likelihood, a map indicating a correction amount of a position and a size of a person to a map position indicating a position of the person, a map indicating a relative position for each type of a joint to a map position indicating a position of a person, a map indicating a joint position as a likelihood for each type of the joint, and a map indicating a correction amount of a joint position to a map position indicating the joint position. Then, the technique according to Non-Patent Document 1 estimates, with an input as an image, a joint position of a person from the image, by using a neural network that outputs each of the maps described above. Note that, the technique according to Non-Patent Document 1 is described in more detail below with reference to the drawings.

RELATED DOCUMENT

Patent Document

Patent Document 1: Japanese Patent Application Publication No. 2004-295436

Non-Patent Document

Non-Patent Document 1: Xingyi Zhou et al., Objects as Points, [Online], filing date Apr. 16, 2019, search date Apr. 23, 2021, https://arxiv.org/abs/1904.07850

DISCLOSURE OF THE INVENTION

Technical Problem

In a case of a conventional technique, there is a problem that estimation accuracy deteriorates when learning data include an image in which some of keypoints are invisible. A reason is described below.

First, as illustrated in FIG. 1, learning data are data associating a training image including a person with a correct answer label indicating a position of each of a plurality of keypoints of a body of the person within the training image. In the figure, a circle indicates a position of each of a plurality of keypoints within the training image. Note that, a type of an illustrated keypoint and the number thereof are one example, and the present invention is not limited thereto.

When a training image in which some of keypoints are invisible is utilized as learning data, the conventional technique performs learning by preparing a correct answer label indicating not only a position of a visible keypoint within the training image but also a position of an invisible keypoint within the training image, as illustrated in FIG. 2. In FIG. 2, a foot of a person located on a near side is hidden by an obstruction and invisible. However, a keypoint at the foot of the person is specified over the obstruction hiding the foot of the person. For example, an operator predicts a position of an invisible keypoint within a training image, based on a visible part of a body of a person, and generates a correct answer label as illustrated in FIG. 2.

In a case of such a configuration, in relation to an invisible keypoint, a position of the keypoint is learned with an image pattern that does not indicate a feature of an appearance of the keypoint. Moreover, since an operator predicts a position, within a training image, of a keypoint being actually invisible in an image, and generates a correct answer label, there is a concern that a deviation from a position of an actual keypoint may be occurred. For the reasons, for example, in a case of the conventional technique, there is a problem that estimation accuracy deteriorates when learning data include an image in which some of keypoints are invisible.

An object of the present invention is to alleviate a problem that estimation accuracy deteriorates when learning data include an image in which some of keypoints are invisible, in a technique for extracting a keypoint of a body of a person from an image by using a learned model.

Solution to Problem

The present invention provides a learning apparatus including:

- an acquisition unit that acquires learning data associating a training image including a person with a correct answer label indicating a position of each person, a correct answer label indicating whether each of a plurality of keypoints of a body of each of the persons is visible in the training image, and a correct answer label indicating a position, within the training image, of the keypoint being visible in the training image among a plurality of the keypoints; and
- a learning unit that learns, based on the learning data, an estimation model that estimates information indicating a position of each person, information indicating whether each of a plurality of the keypoints of each person included in a processing image is visible in the processing image, and information being related to a position of each of keypoints for computing a position, within the processing image, of the keypoint being visible in the processing image.

Moreover, the present invention provides a learning method of executing, by a computer:

- an acquisition step of acquiring learning data associating a training image including a person with a correct answer label indicating a position of each person, a correct answer label indicating whether each of a plurality of keypoints of a body of each of the persons is visible in the training image, and a correct answer label indicating a position, within the training image, of the keypoint being visible in the training image among a plurality of the keypoints; and a learning step of learning, based on the learning data, an estimation model that estimates information indicating a position of each person, information indicating whether each of a plurality of the keypoints of each person included in a processing image is visible in the processing image, and information being related to a position of each of keypoints for computing a position, within the processing image, of the keypoint being visible in the processing image.

Moreover, the present invention provides a program causing a computer to function as:

an acquisition unit that acquires learning data associating a training image including a person with a correct answer label indicating a position of each person, a correct answer label indicating whether each of a plurality of keypoints of a body of each of the persons is visible in the training image, and a correct answer label indicating a position, within the training image, of the keypoint being visible in the training image among a plurality of the keypoints; and a learning unit that learns, based on the learning data, an estimation model that estimates information indicating a position of each person, information indicating whether each of a plurality of the keypoints of each person included in a processing image is visible in the processing image, and information being related to a position of each of keypoints for computing a position, within the processing image, of the keypoint being visible in the processing image.

Moreover, the present invention provides an estimation apparatus including an estimation unit that estimates a position, within a processing image, of each of a plurality of keypoints of each person included in the processing image, by using an estimation model learned by the learning apparatus.

Moreover, the present invention provides an estimation method of executing, by a computer, an estimation step of estimating a position, within a processing image, of each of a plurality of keypoints of each person included in the processing image, by using an estimation model learned by the learning apparatus.

Moreover, the present invention provides a program causing a computer to function as an estimation unit that estimates a position, within a processing image, of each of a plurality of keypoints of each person included in the processing image, by using an estimation model learned by the learning apparatus.

Advantageous Effects of Invention

The present invention can alleviate a problem that estimation accuracy deteriorates when learning data include an image in which some of keypoints are invisible, in a technique for extracting a keypoint of a body of a person from an image by using a learned model.

BRIEF DESCRIPTION OF THE DRAWINGS

FIG. 3 is a diagram for describing a conventional technique.

FIG. 8 is a diagram for describing the technique according to the present example embodiment.

FIG. 21 is a flowchart illustrating one example of a flow of processing of the estimation apparatus according to the present example embodiment.

DESCRIPTION OF EMBODIMENTS

Hereinafter, example embodiments of the present invention are described by using the drawings. Note that, a similar reference sign is assigned to a similar component in all the drawings, and description is omitted as appropriate.

First Example Embodiment

<Outline>

A learning apparatus 10 according to the present example embodiment learns by excluding information of a keypoint that is invisible in an image, and thereby alleviates a problem that estimation accuracy deteriorates when learning data include an image in which some of keypoints are invisible.

Feature of Technique According to the Present Example Embodiment

First, while comparing with a technique described in Non-Patent Document 1, a feature of a technique according to the present example embodiment, specifically, a configuration for achieving "learning excluding information of a keypoint that is invisible in an image" is described.

—Technique Described in Non-Patent Document 1—

First, the technique described in Non-Patent Document 1 is described. As illustrated in FIG. 3, in a case of the technique described in Non-Patent Document 1, when an image is input to a neural network, a plurality of pieces of data as illustrated are output. In other words, the neural network described in Non-Patent Document 1 is composed of a plurality of layers that output a plurality of pieces of data as illustrated.

Figure 1:
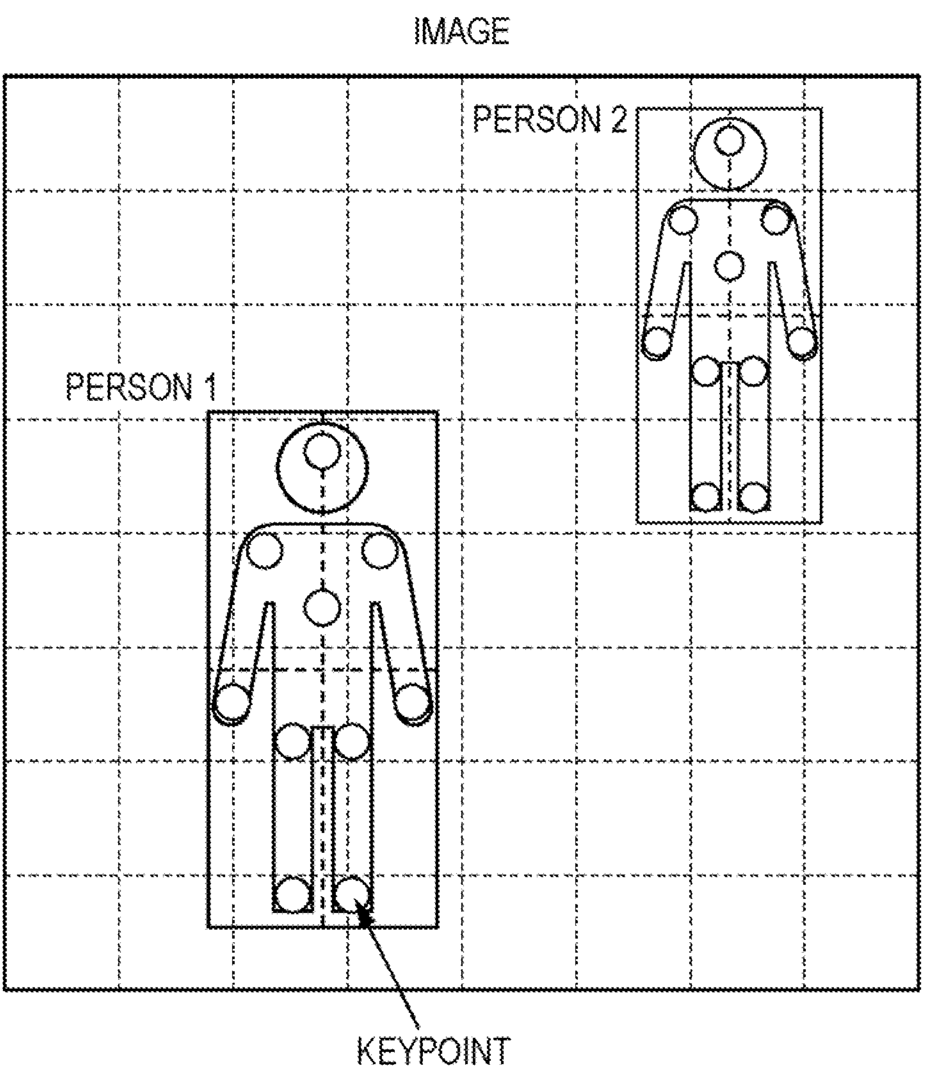
FIG. 1 is a diagram for describing a feature of a technique according to the present example embodiment.
Figure 2:
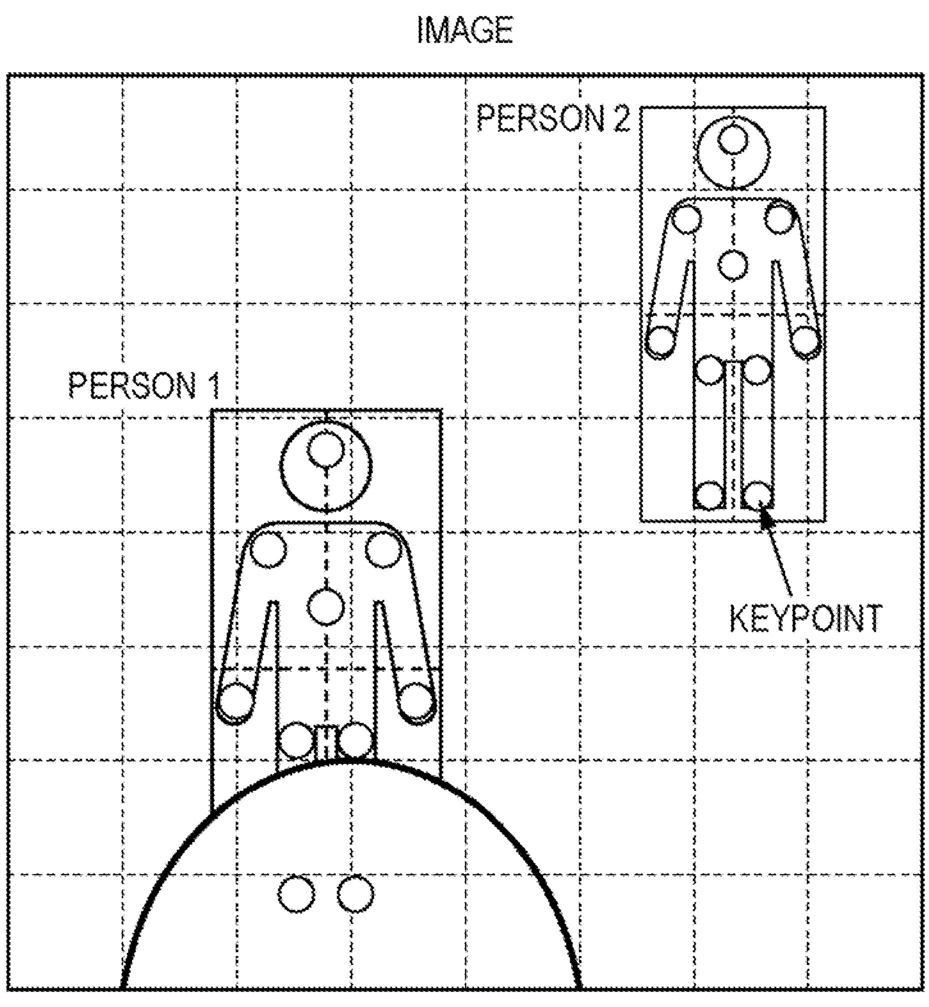
FIG. 2 is a diagram for describing a feature of the technique according to the present example embodiment.
Figure 4:
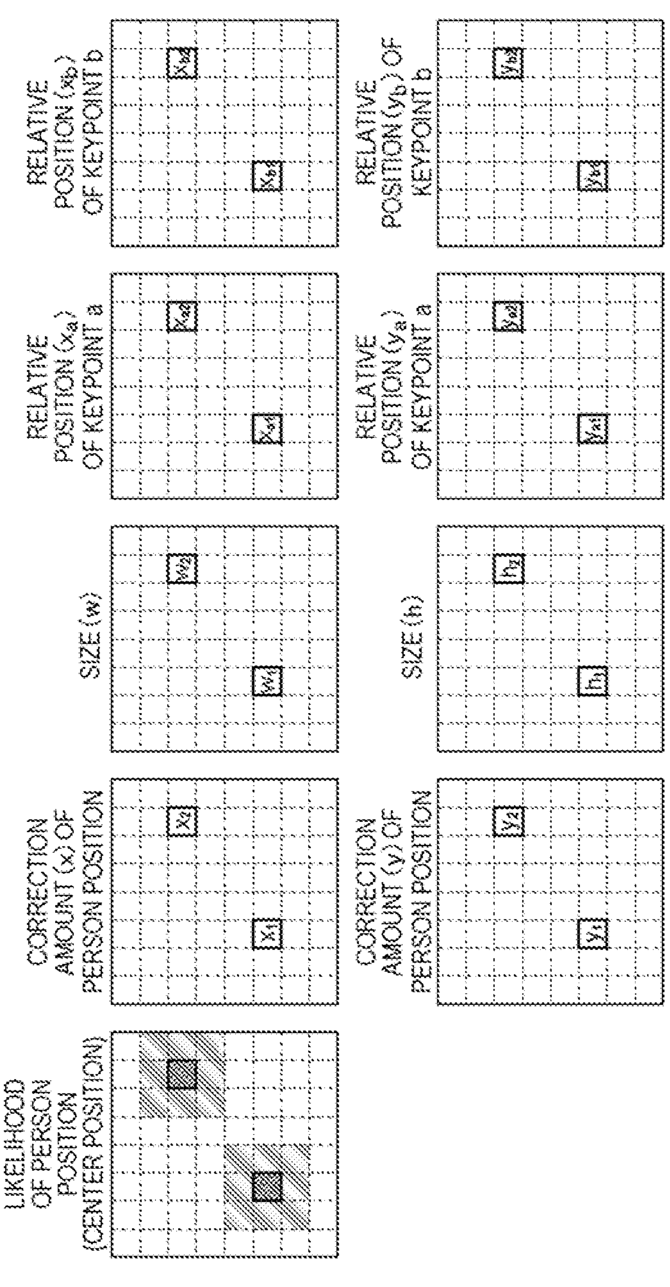
FIG. 4 is a diagram for describing the conventional technique.
Figure 5:
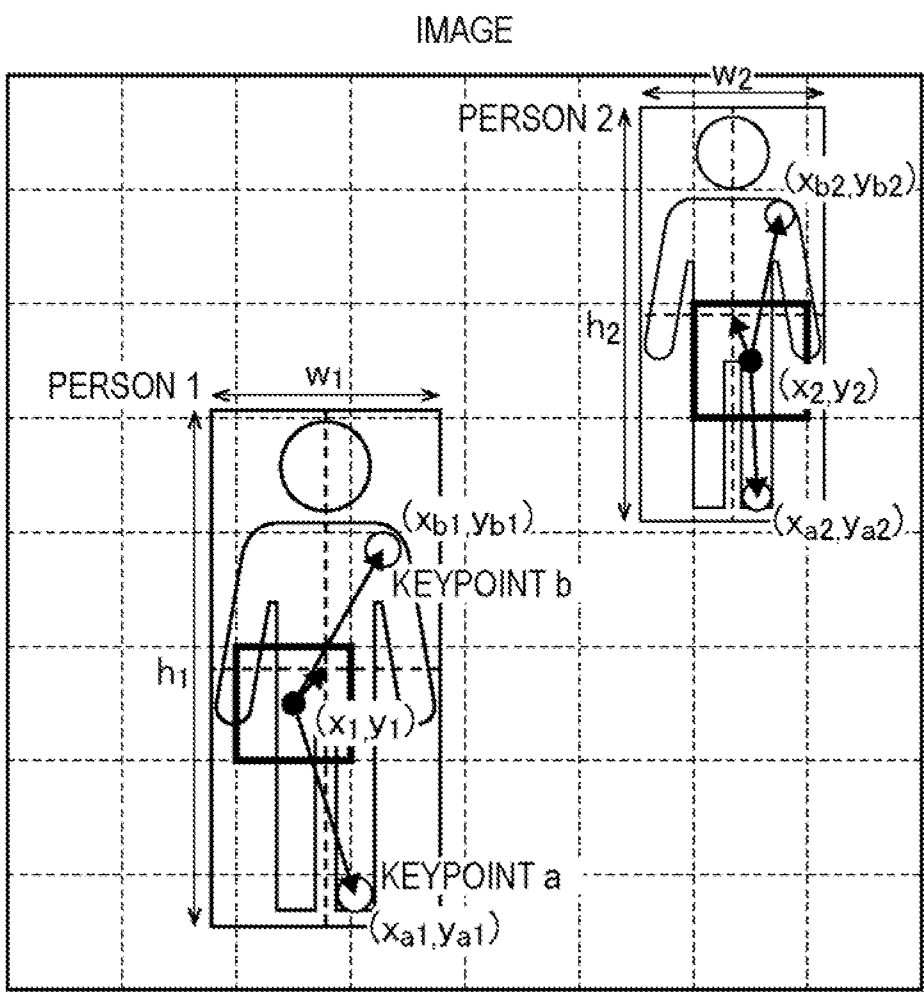
FIG. 5 is a diagram for describing the conventional technique.

One example of a "likelihood of a person position", a "correction amount of a person position", a "size", a "relative position of a keypoint a", and a "relative position of a keypoint b" in a plurality of pieces of data illustrated in FIG. 3 is illustrated in FIG. 4. FIG. 5 illustrates a diagram in which a description indicating a concept of each piece of data in FIG. 4 is added to an image serving as an original of the data in FIG. 4.

Data of a "likelihood of a person position" are data indicating a likelihood of a position of a center position of a body of a person within an image. For example, a body of a person is detected within an image, based on a feature value of an appearance of the body of a person, and data indicating a likelihood of a center position of the body of the person are output based on a detection result. As illustrated, the data indicate a likelihood that the center position of the body of a person is located in each of a plurality of lattices acquired by dividing the image. Note that, a method of dividing an image into a lattice shape is a matter of design, and the number and size of lattices illustrated in the figure are merely one example. According to data illustrated in FIG. 4, "a lattice third from left and third from bottom" and "a lattice second from right and third from top" are determined as lattices in which a center position of a body of a person is located. When an image including a plurality of persons is input as illustrated in FIG. 5, a lattice in which a center position of a body of each of a plurality of persons is located is determined.

Data of a "correction amount of a person position" are data indicating a movement amount in an x direction and a movement amount in a y direction for movement from a center of a lattice in which a center position of a body of a person is determined to be located, to the center position of the body of the person. As illustrated in FIG. 5, a center position of a body of a person exists at a certain position within one lattice. By utilizing a likelihood of a person position and a correction amount of a person position, a center position of a body of a person within an image can be determined.

Data of a "size" are data indicating vertical and horizontal lengths of a rectangular area containing a body of a person.

Data of a "relative position of a keypoint" are data indicating a position of each of a plurality of keypoints within an image. Specifically, a relative positional relationship between each of a plurality of keypoints and a center of a lattice in which a center position of a body is located is illustrated. Note that, although positions of two keypoints are illustrated for each person in FIGS. 4 and 5, the number of keypoints is able to be equal to or more than three.

Figure 6:
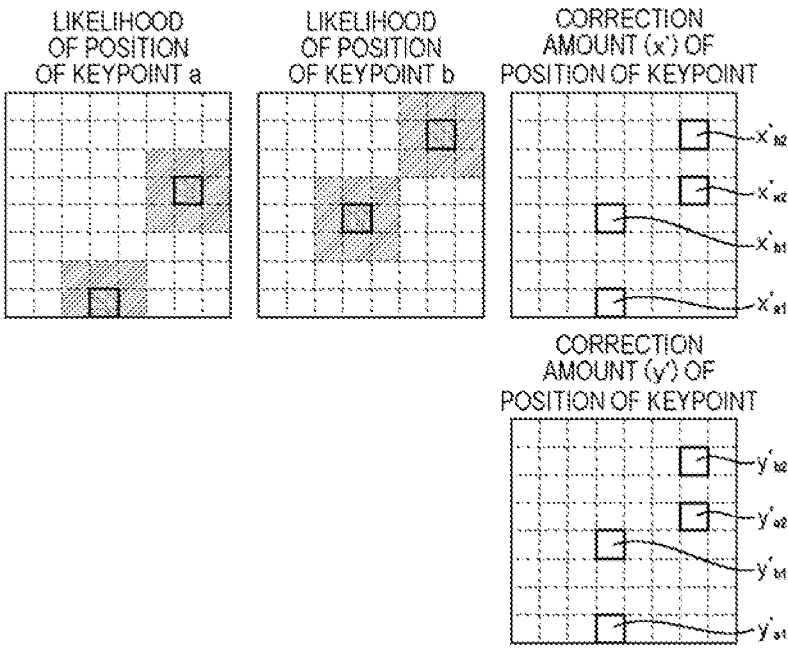
FIG. 6 is a diagram for describing the conventional technique.
Figure 7:
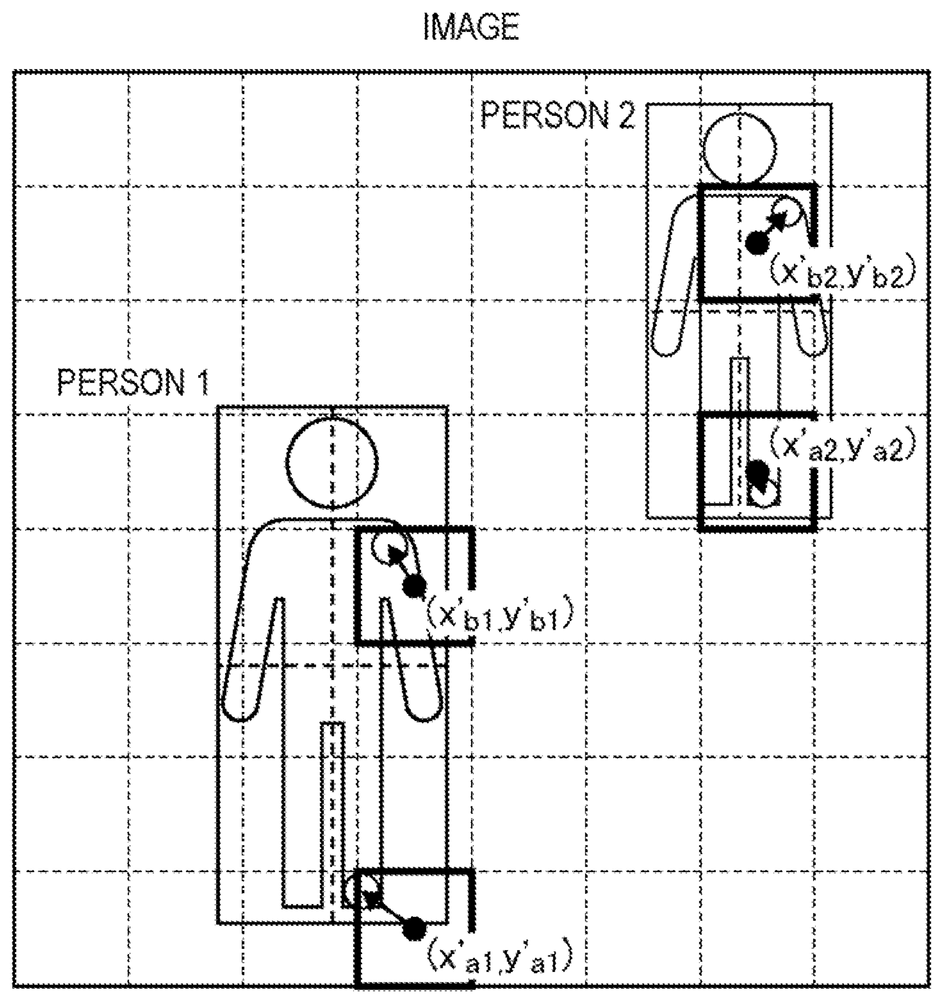
FIG. 7 is a diagram for describing the conventional technique.

Next, one example of a "likelihood of a position of a keypoint a", a "likelihood of a position of a keypoint b", and a "correction amount of a position of a keypoint" among a plurality of pieces of data illustrated in FIG. 3 is illustrated in FIG. 6. FIG. 7 illustrates a diagram in which a description indicating a concept of each piece of data in FIG. 6 is added to an image serving as an original of the data in FIG. 6.

Data of a "likelihood of a position of a keypoint" are data indicating a likelihood of a position of each of a plurality of keypoints within an image. For example, each keypoint is detected within an image, based on a feature value of an appearance of each of a plurality of keypoints, and data indicating a likelihood of a position of each keypoint are output based on a detection result. As illustrated, the data are output for each keypoint. Then, the data indicate a likelihood that each keypoint is located in each of a plurality of lattices acquired by dividing the image. Note that, the number of lattices illustrated is merely one example. When an image including a plurality of persons is input as illustrated in FIG. 7, a likelihood that a keypoint of each of the plurality of persons is located is indicated. According to the data illustrated in FIG. 6, "a lattice fourth from left and first from bottom" and "a lattice second from right and fourth from top" are determined as lattices in which the keypoint a is located. Moreover, "a lattice fourth from left and fourth from bottom" and "a lattice second from right and second from top" are determined as lattices in which the keypoint b is located. Note that, although the figure illustrates data of two keypoints, the number of keypoints is able to be equal to or more than three. Then, data as described above are output for each keypoint.

Data of a "correction amount of a position of a keypoint" are data indicating a movement amount in the x direction and a movement amount in the y direction for movement from a center of a lattice in which each of a plurality of keypoints is determined to be located to a position of each keypoint. As illustrated in FIG. 7, each keypoint exists at a certain position within one lattice. A position of each keypoint within an image can be determined by utilizing a likelihood of a position of each keypoint and a correction amount of the position of each keypoint.

In the technique described in Non-Patent Document 1, a parameter of an estimation model is computed (learned) by outputting a plurality of pieces of data as described above from an input image, and then minimizing a value of a predetermined loss function, based on the plurality of pieces of data and a previously given correct answer label. Moreover, at estimation, a position of each keypoint within an image is determined by two methods (a relative position from a center position of a lattice illustrated in FIG. 4, and a likelihood and a correction amount illustrated in FIG. 6), but, for example, a result of integrating positions computed by each of the two methods is utilized as a position of each of a plurality of keypoints. As a method of integration, averaging, weighted averaging, selection of one of them, and the like are exemplified.

Technique According to the Present Example Embodiment

Next, the technique according to the present example embodiment is described in comparison with the technique described in Non-Patent Document 1. As illustrated in FIG. 8, in the technique according to the present example embodiment as well, when an image is input to a neural network, a plurality of pieces of data as illustrated are output. In other words, the neural network according to the present example embodiment is composed of a plurality of layers that output a plurality of pieces of data as illustrated.

As clear from a comparison between FIGS. 3 and 8, the technique according to the present example embodiment differs from the technique described in Non-Patent Document 1 in including, within data to be output, data of "hiding information" being associated with each of a plurality of keypoints.

Figure 9:
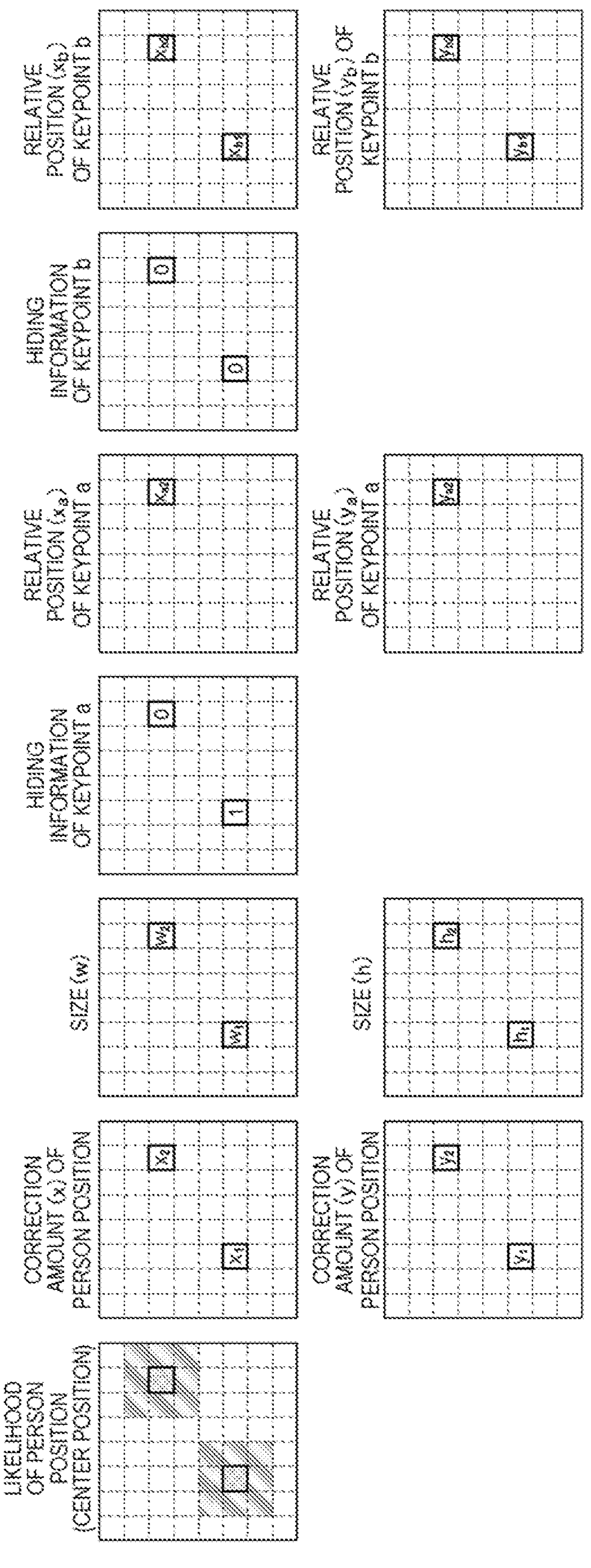
FIG. 9 is a diagram for describing the technique according to the present example embodiment.
Figure 10:
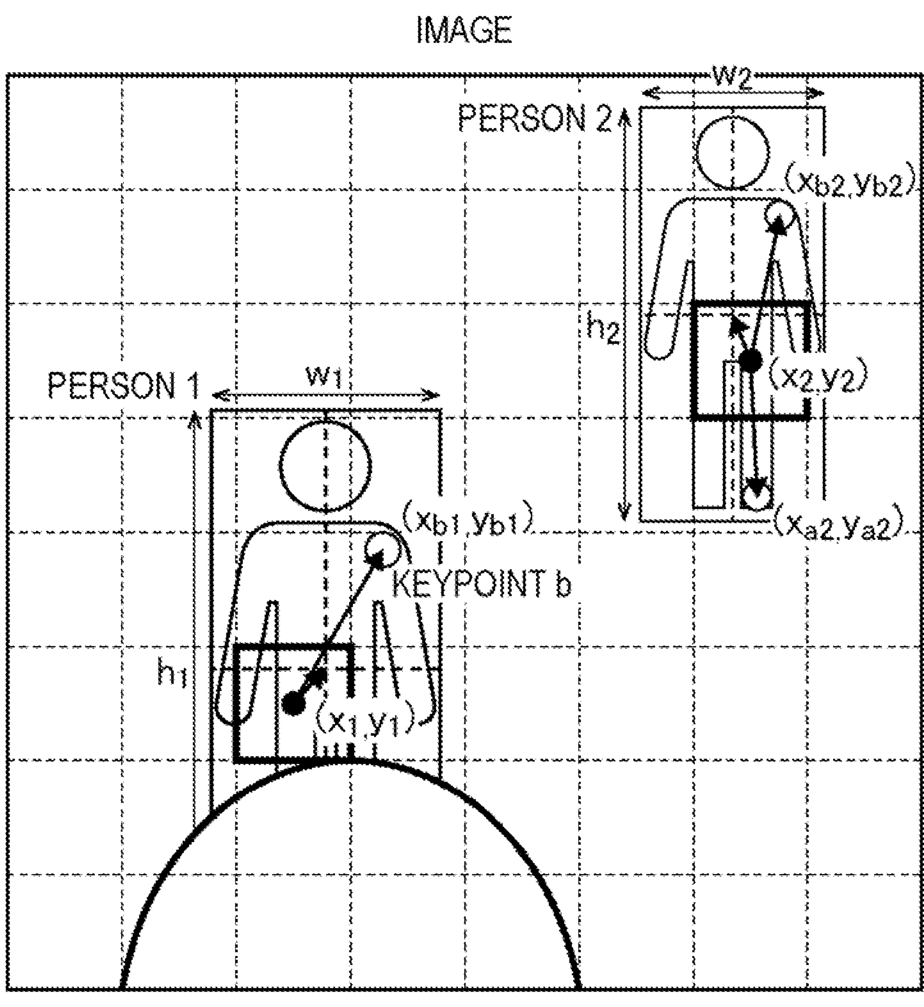
FIG. 10 is a diagram for describing the technique according to the present example embodiment.

One example of a "likelihood of a person position", a "correction amount of a person position", a "size", "hiding information of the keypoint a", a "relative position of the keypoint a", "hiding information of the keypoint b", and a "relative position of the keypoint b" among the plurality of pieces of data illustrated in FIG. 8 is illustrated in FIG. 9. FIG. 10 illustrates a diagram in which a description indicating a concept of each piece of data in FIG. 9 is added to an image serving as an original of the data in FIG. 9.

The data of a "likelihood of a person position", a "correction amount of a person position" and a "size" have the same concept as the technique described in Non-Patent Document 1.

Data of a "hiding information of a keypoint" are data indicating whether each keypoint is hidden in an image, i.e., whether each keypoint is visible in an image. A state in which a keypoint is invisible in an image includes a state in which the keypoint is located outside the image, and a state in which the keypoint is located within the image but hidden by another object (another person, another object, and the like).

As illustrated in FIG. 9, the data are output for each keypoint. In the illustrated example, a value of "0" is given to a visible keypoint, and a value of "1" is given to an invisible keypoint. In a case of an example illustrated in FIG. 10, the keypoint a of a person 1 located on a near side is hidden behind another object and invisible. Thus, utilization of a learned neural network according to the present example embodiment leads to outputting of data to which "1" is given as hiding information of the keypoint a of the person 1 as illustrated in FIG. 9.

Note that, although data of two keypoints are illustrated in the figure, the number of keypoints is able to be equal to or more than three. Then, data as described above are output for each keypoint.

Data of a "relative position of a keypoint" are data indicating a position of each of a plurality of keypoints within an image. Data of a "relative position of a keypoint" according to the present example embodiment differ from those described in the technique described in Non-Patent Document 1 in including data of a keypoint that is indicated to be visible by data of hiding information of the keypoint, and not including data of a keypoint that is indicated to be invisible by data of hiding information of the keypoint. Other points have the same concept as the technique described in Non-Patent Document 1.

In a case of the example illustrated in FIG. 10, the keypoint a (keypoint at a foot) of the person 1 located on a near side is hidden behind another object and invisible. Thus, utilization of a learned neural network according to the present example embodiment leads to outputting of data of a relative position of the keypoint a that do not include data of a relative position of the keypoint a of the person 1 as illustrated in FIG. 9. The data of the relative position of the keypoint a illustrated in FIG. 9 include only data of a relative position of the keypoint a of the person 2 illustrated in FIG. 10.

Figure 11:
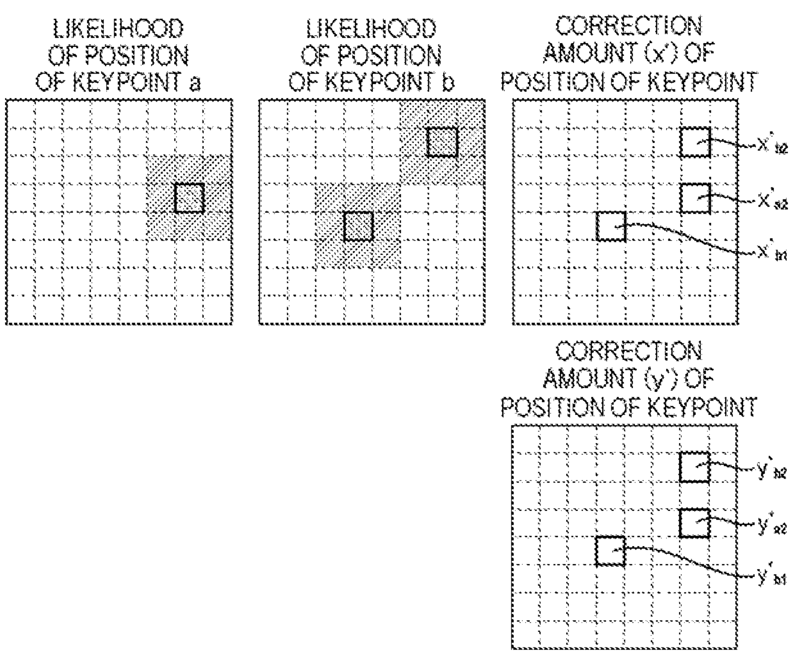
FIG. 11 is a diagram for describing the technique according to the present example embodiment.
Figure 12:
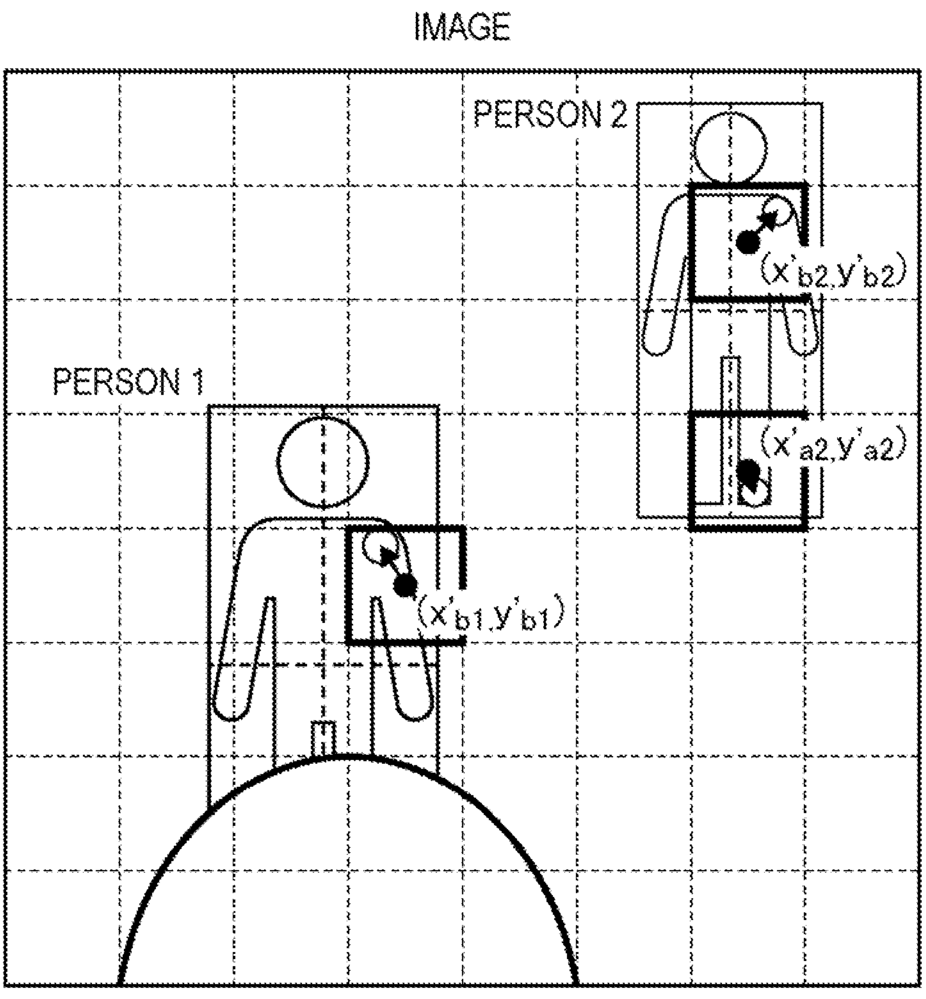
FIG. 12 is a diagram for describing the technique according to the present example embodiment.

Next, one example of a "likelihood of a position of the keypoint a", a "likelihood of a position of the keypoint b", and a "correction amount of a position of a keypoint" among a plurality of pieces of data illustrated in FIG. 8 is illustrated in FIG. 11. FIG. 12 illustrates a diagram in which a description indicating a concept of each piece of data in FIG. 11 is added to an image serving as an original of the data in FIG. 11.

Data of a "likelihood of a position of a keypoint" have the same concept as the technique described in Non-Patent Document 1. In a case of the example illustrated in FIG. 12, the keypoint a of the person 1 located on a near side is hidden behind another object and invisible. Thus, utilization of a learned neural network according to the present example embodiment leads to outputting of data of a likelihood of the position of the keypoint a that do not include data of a likelihood of the position of the keypoint a of the person 1 as illustrated in FIG. 11. The data of the likelihood of the position of the keypoint a illustrated in FIG. 11 include only the data of the likelihood of the position of the keypoint a of the person 2 illustrated in FIG. 12.

Data of a "correction amount of a position of a keypoint" have the same concept as the technique described in Non-Patent Document 1. In a case of the example illustrated in FIG. 12, the keypoint a (keypoint at a foot) of the person 1 located on a near side is hidden behind another object and invisible. Thus, utilization of a learned neural network according to the present example embodiment leads to outputting of data of a correction amount of a position of the keypoint a that do not include data of a likelihood of the position of the keypoint a as illustrated in FIG. 11.

As described above, the technique according to the present example embodiment differs from the technique described in Non-Patent Document 1 at least in outputting data of hiding information for each of a plurality of keypoints, and not outputting data of a position of a keypoint that is indicated to be invisible by hiding information. Then, the technique according to the present example embodiment has the features that the technique described in Non-Patent Document 1 does not have, and thereby achieves learning that excludes information of a keypoint that is invisible in an image.

<Functional Configuration>

Figure 13:
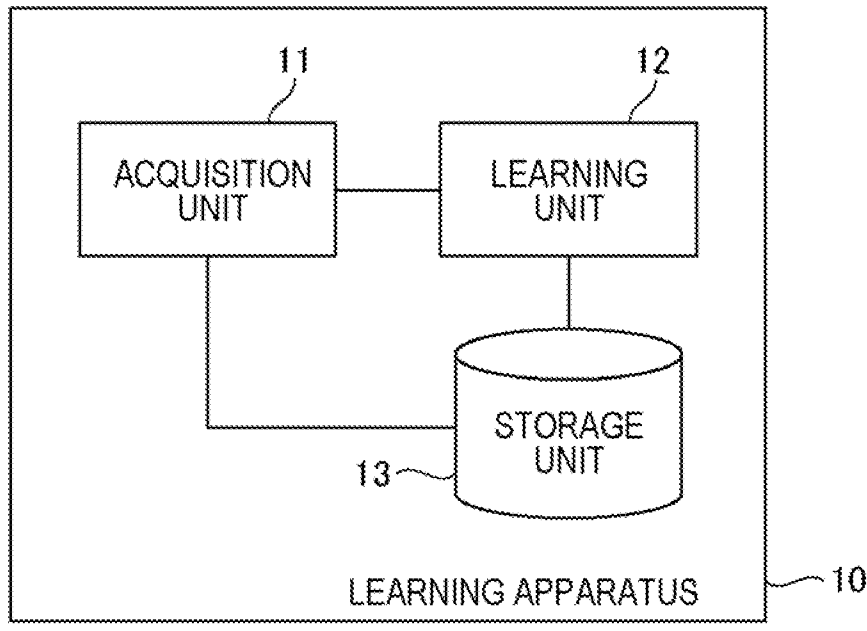
FIG. 13 is one example of a functional block diagram of a learning apparatus according to the present example embodiment.
Figure 14:
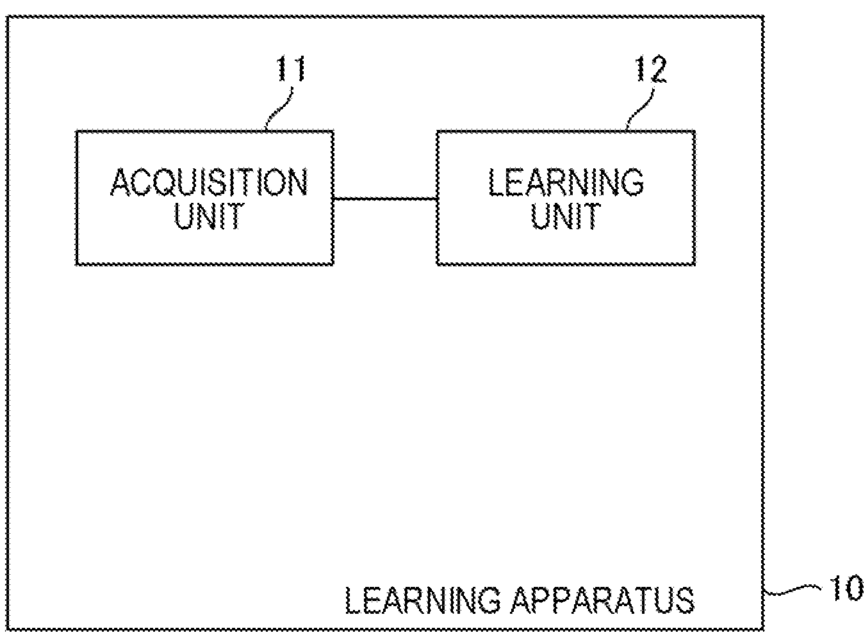
FIG. 14 is one example of a functional block diagram of the learning apparatus according to the present example embodiment.

Next, a functional configuration of the learning apparatus according to the present example embodiment is described. FIG. 13 illustrates one example of a functional block diagram of the learning apparatus 10. As illustrated, the learning apparatus 10 includes an acquisition unit 11, a learning unit 12, and a storage unit 13. Note that, as illustrated in a functional block diagram of FIG. 14, the learning apparatus 10 may not include the storage unit 13. In this case, an external apparatus configured communicably with the learning apparatus 10 includes the storage unit 13.

The acquisition unit 11 acquires learning data associating a training image with a correct answer label. The training image includes a person. A training image may include only one person or may include a plurality of persons. The correct answer label indicates whether at least each of a plurality of keypoints of a body of a person is visible in the training image, and a position, within a training image, of a keypoint that is visible in the training image. A correct answer label does not indicate a position, within a training image, of a keypoint that is invisible in the training image. Note that, a correct answer label may include, for example, another piece of information such as a position of a person or a size of a person. Moreover, a correct answer label may be a new correct answer label acquired by processing an original correct answer label. For example, a correct answer label may be such a plurality of pieces of data as illustrated in FIG. 8 processed from a position of the keypoint within a training image and hiding information of the keypoint.

For example, an operator who forms a correct answer label may perform a work of specifying, within an image, only a keypoint visible within the image, or the like. Then, the operator may not perform a troublesome work such as predicting a position, within an image, of a keypoint that is hidden behind another object and invisible, and specifying the position within the image.

The keypoint may be at least a part of a joint part, a predetermined part (an eye, a nose, a mouth, a navel, or the like), and a terminal part of a body (a tip of a head, a toe, a fingertip, or the like). Moreover, a keypoint may be another part. There are various ways of defining the number of keypoints and a position, and the present invention is not particularly limited.

For example, a large number of pieces of learning data are stored in the storage unit 13. Then, the acquisition unit 11 can acquire learning data from the storage unit 13.

The learning unit 12 learns an estimation model, based on learning data. The storage unit 13 stores the estimation model. The estimation model is configured in such a way as to include the neural network described by using FIG. 8. The estimation model outputs a plurality of pieces of data illustrated in FIG. 8. The plurality of pieces of data illustrated in FIG. 8 indicate information indicating a position of each person, information indicating whether each of a plurality of keypoints of each person included in a processing image is visible in the processing image, information being related to a position of each keypoint for computing a position within a processing image of a keypoint visible in the processing image, and the like. The information being related to a position of each keypoint indicates a relative position of each keypoint, a likelihood of a position of each keypoint, a correction amount of a position of each keypoint, and the like.

Then, various estimation processing can be performed by using a plurality of pieces of data output by the estimation model. For example, an estimation unit (e.g., an estimation unit 21 described in the following example embodiment) performs predetermined arithmetic processing based on a part of a plurality of pieces of data as described by using FIGS. 8 to 12. The estimation unit can estimate a position, within a processing image, of a keypoint within a processing image visible in the processing image. For example, the estimation unit computes, as a position of each of a plurality of keypoint within a processing image, a result of integrating a position of each keypoint within the processing image determined based on a likelihood of a position of a person (a center position of the person) illustrated in FIG. 9 and a relative position from a center position, and a position of each keypoint within a processing image determined based on the likelihood of a position of each keypoint and a correction amount illustrated in FIG. 11. As a method of integration, averaging, weighted averaging, selection of one of them, and the like are exemplified, but the present invention is not limited thereto.

The learning unit 12 learns by using only information of a keypoint that is indicated to be visible in hiding information of learning data and positional information of a keypoint of learning data, i.e., without using information of a keypoint that is indicated to be invisible in hiding information of learning data and positional information of a keypoint of learning data. For example, during learning relating to a position of a keypoint, the learning unit 12 adjusts a parameter of an estimation model in such a way as to minimize an error between positional information of a keypoint output from an estimation model being learned, and positional information of a keypoint of learning data (a correct answer label), for a position on a lattice indicating that a keypoint is visible in learning data.

Herein, a specific example of a method of learning by the learning unit 12 is described.

Regarding data of a likelihood of a position (center position) of a person, the learning unit 12 learns in such a way as to minimize an error between a map indicating a likelihood of a position of a person output from an estimation model being learned, and a map indicating a likelihood of a position of a person of learning data. Moreover, regarding data of a correction amount of a position of a person, a size of a person, and hiding information of each keypoint, the learning unit 12 learns in such a way as to minimize an error between a correction amount of a position of a person, a size of a person, and hiding information of each keypoint output from an estimation model being learned, and a correction amount of a position of a person of learning data, a size of a person, and hiding information of each keypoint, for only a position on a lattice indicating a position of a person of learning data.

Moreover, regarding data at a relative position of each keypoint, the learning unit 12 learns in such a way as to minimize an error between a relative position of each keypoint output from an estimation model being learned and a relative position of each keypoint of learning data, further for only a position on a lattice indicating that there is no hiding by hiding information of each keypoint of learning data, among positions on the lattice indicating positions of a person of the learning data.

Moreover, regarding data of a likelihood of a position of each keypoint, the learning unit 12 learns in such a way as to minimize an error between a map indicating a likelihood of a position of each keypoint output from an estimation model being learned and a map indicating a likelihood of a position of each keypoint of learning data. Moreover, regarding data of a correction amount of a position of each keypoint, the learning unit 12 learns in such a way as to minimize an error between a correction amount of a position of each keypoint output from an estimation model being learned and a correction amount of a position of each keypoint of learning data, for only a position on a lattice indicating a position of each keypoint of learning data. Since a likelihood of a position of each keypoint of learning data and a correction amount of a position of a keypoint of learning data are indicated only for a visible keypoint, it becomes natural to learn only with a visible keypoint.

In this way, during learning relating to a position of a keypoint, the learning unit 12 adjusts a parameter of an estimation model in such a way as to minimize an error between positional information of a keypoint output from an estimation model being learned, and positional information of a keypoint of learning data (a correct answer label), for a position on a lattice indicating that a keypoint is visible in learning data.

Figure 15:
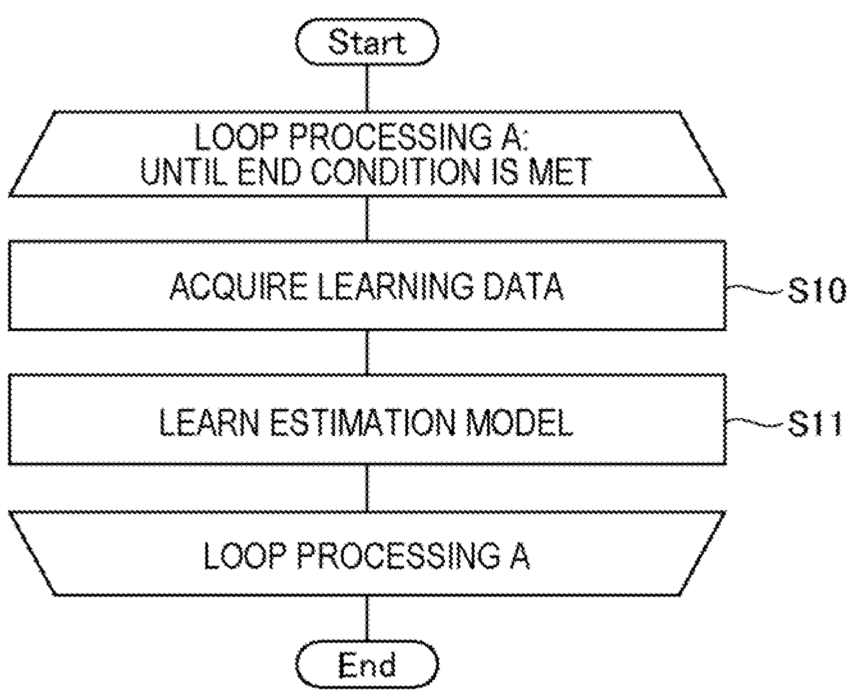
FIG. 15 is a flowchart illustrating one example of a flow of processing of the learning apparatus according to the present example embodiment.

One example of a flow of processing of the learning apparatus 10 is described by using FIG. 15.

In S10, the learning apparatus 10 acquires learning data associating a training image with a correct answer label. The processing is achieved by the acquisition unit 11. Details of processing executed by the acquisition unit 11 are as described above.

In S11, the learning apparatus 10 learns the estimation model by using the learning data acquired in S10. The processing is achieved by the learning unit 12. Details of the processing executed by the learning unit 12 are as described above.

The learning apparatus 10 repeats a loop of S10 and S11 until an end condition is met. The end condition is defined by using, for example, a value of a loss function or the like.

<Hardware Configuration>

Next, one example of a hardware configuration of the learning apparatus 10 is described. Each functional unit of the processing apparatus 10 is achieved by any combination of hardware and software mainly including a central processing unit (CPU) of any computer, a memory, a program loaded onto the memory, a storage unit such as a hard disk that stores the program (that can store not only a program previously stored from a phase of shipping an apparatus but also a program downloaded from a storage medium such as a compact disc (CD) or a server or the like on the Internet), and an interface for network connection. Then, it is appreciated by a person skilled in the art that there are a variety of modified examples of a method and an apparatus for the achievement.

Figure 16:
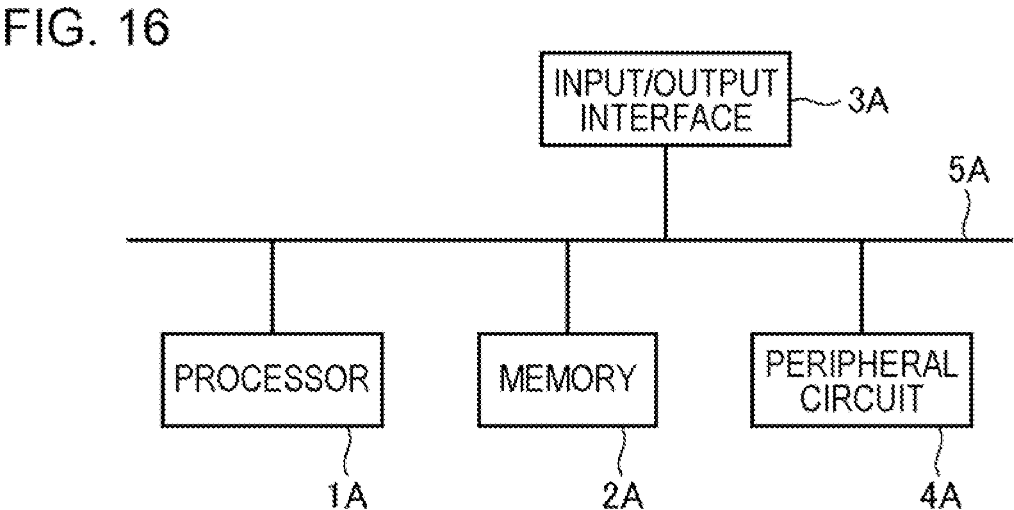
FIG. 16 is a diagram illustrating one example of a hardware configuration of the learning apparatus and an estimation apparatus according to the present example embodiment.

FIG. 16 is a block diagram illustrating a hardware configuration of the learning apparatus 10. As illustrated in FIG. 16, the learning apparatus 10 includes a processor 1A, a memory 2A, an input/output interface 3A, a peripheral circuit 4A, and a bus 5A. The peripheral circuit 4A includes various modules. The learning apparatus 10 may not include the peripheral circuit 4A. Note that, the learning apparatus 10 may be configured by a plurality of physically and/or logically separated apparatuses. In this case, each of a plurality of apparatuses can include the hardware configuration described above.

The bus 5A is a data transmission path for the processor 1A, the memory 2A, the peripheral circuit 4A, and the input/output interface 3A to mutually transmit and receive data. The processor 1A is, for example, an arithmetic processing apparatus such as a CPU or a graphics processing unit (GPU). The memory 2A is, for example, a memory such as a random access memory (RAM) or a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, or the like. The processor 1A can give an instruction to each of modules, and perform an arithmetic operation, based on an arithmetic result of each of the modules.

Advantageous Effect

An estimation model learned by the learning apparatus 10 according to the present example embodiment has a feature of outputting data of hiding information indicating whether each of a plurality of keypoints is visible in an image. Then, the estimation model further has a feature of not outputting positional information of a keypoint that is indicated to be invisible by data of hiding information. Moreover, the learning apparatus 10 has a feature that, when an estimation model is learned, only positional information in which a keypoint is visible in an image may be given in relation to learning data of positional information of a keypoint. The learning apparatus 10 optimizes a parameter of an estimation model, based on a result output from such an estimation model and a correct answer label (learning data). According to such a learning apparatus 10, it becomes possible to correctly learn by excluding information on a keypoint that is invisible in an image. As a result, a problem that estimation accuracy deteriorates when learning data include an image in which some of keypoints are invisible can be alleviated.

Second Example Embodiment

An estimation apparatus according to the present example embodiment estimates a position, within an image, of each of a plurality of keypoints of each person included in the image, by using an estimation model learned by the learning apparatus according to the first example embodiment. Details are described below.

Figure 17:
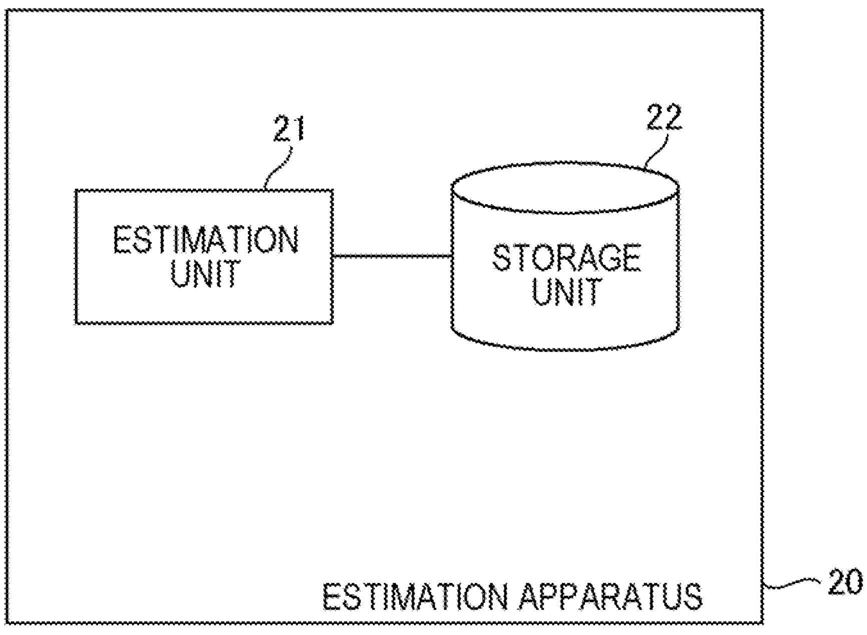
FIG. 17 is one example of a functional block diagram of the estimation apparatus according to the present example embodiment.
Figure 18:
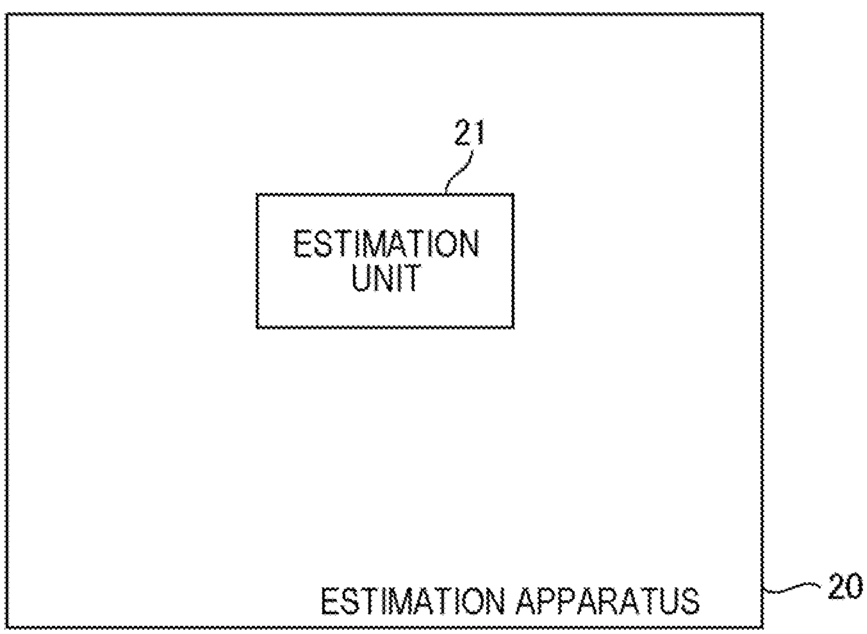
FIG. 18 is one example of a functional block diagram of the estimation apparatus according to the present example embodiment.

One example of a functional block diagram of an estimation apparatus 20 is illustrated in FIG. 17. As illustrated, the estimation apparatus 20 includes an estimation unit 21 and a storage unit 22. Note that, as illustrated in the functional block diagram of FIG. 18, an estimation apparatus 20 may not include the storage unit 22. In this case, an external apparatus configured communicably with the estimation apparatus 20 includes the storage unit 22.

The estimation unit 21 acquires any image as a processing image. For example, the estimation unit 21 may acquire, as a processing image, an image captured by a surveillance camera.

Then, the estimation unit 21 estimates a position, within a processing image, of each of a plurality of keypoints of each person included in the processing image, by using an estimation model learned by the learning apparatus 10, and outputs the position. As described in the first example embodiment, the estimation model outputs data described by using FIGS. 8 to 11 when an image is input. The estimation unit 21 further performs estimation processing by using the data output by the estimation model, thereby estimates a position, within the processing image, of each of a plurality of keypoints of each person included in the processing image, and outputs the position as an estimation result. A learned estimation model is stored in the storage unit 22. Output of an estimation result is achieved by utilizing every possible means such as a display, a projection apparatus, a printer, and e-mail. Moreover, the estimation unit 21 may output the data output by the estimation model, as it is as an estimation result.

Figure 19:
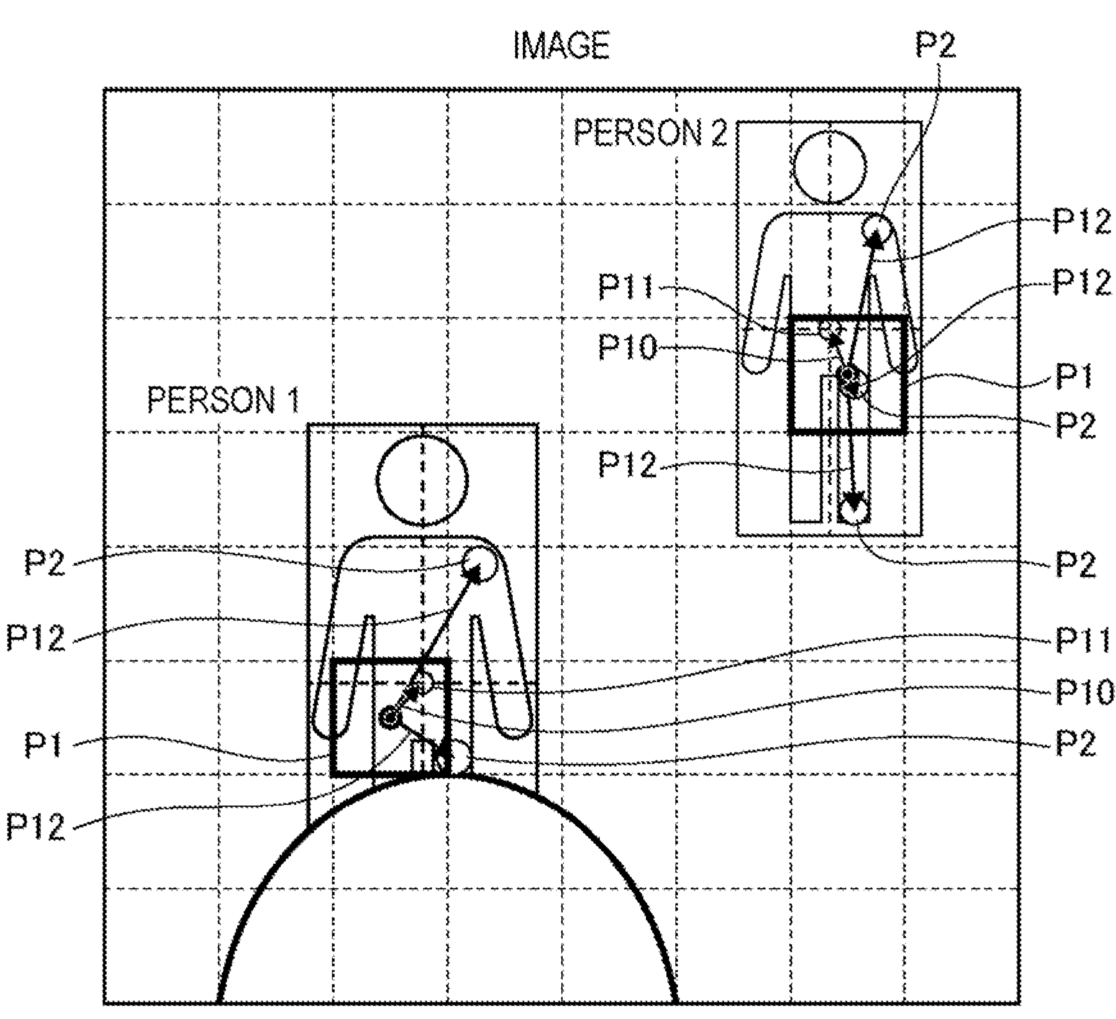
FIG. 19 is a diagram for describing processing of the estimation apparatus according to the present example embodiment.
Figure 20:
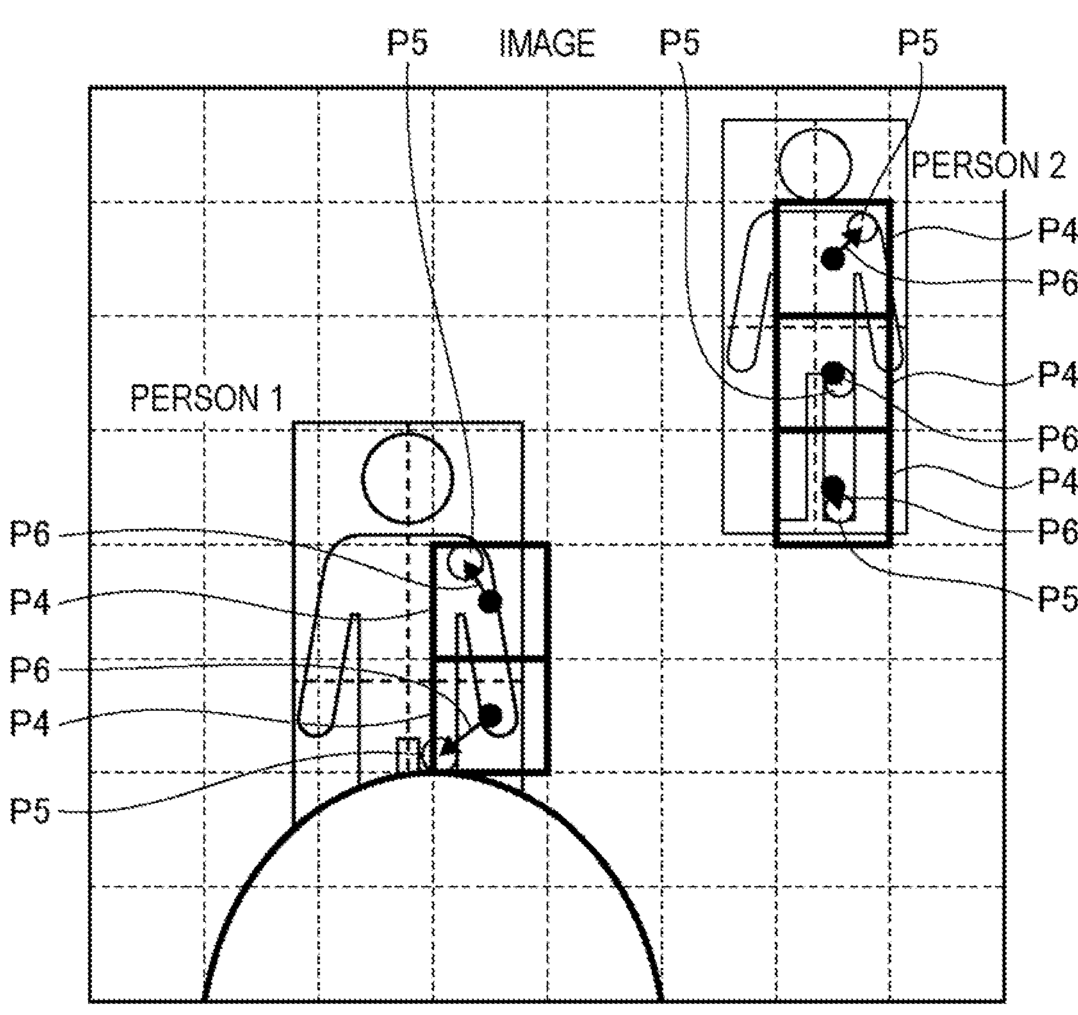
FIG. 20 is a diagram for describing processing of the estimation apparatus according to the present example embodiment.

Note that, the estimation unit 21 has a feature of estimating, by using an estimation model, whether each of a plurality of keypoints of each person included in a processing image is visible in the processing image, and estimating, by using a result of the estimation, a position, within the processing image, of each of a plurality of keypoints for each person included in the processing image. One example of processing performed by the estimation unit 21 is described below by using FIGS. 19 and 20.

(Step 1): A processing image is processed by an estimation model, and a plurality of pieces of data as illustrated in FIGS. 8 to 11 are acquired.

(Step 2): A lattice (P1 in FIG. 19) in which a center position (P11 in FIG. 19) of a person for each person is located (included) is determined based on data of a likelihood of a person position. Specifically, a lattice whose likelihood is equal to or more than a threshold value is determined.

(Step 3): A correction amount (P10 in FIG. 19) being associated with the position of the lattice determined in (Step 2) is acquired from data of a correction amount of a person position.

(Step 4): Based on the position (including a center position of the lattice as well) of the lattice determined in (Step 2), and the correction amount acquired in (Step 3), a center position (P11 in FIG. 19) of a person within a processing is determined for each person included in the processing image. Thereby, a center position of a body of each person is determined.

(Step 5): A size of a person being associated with the position of the lattice determined in (Step 2) is acquired from data of a size. Thereby, a size of each person is determined.

(Step 6): Data being associated with the position of the lattice determined in (Step 2) are acquired from data of hiding information of each keypoint. Thereby, information of being invisible and information of being visible at each keypoint of each person are determined.

(Step 7): Only data (P12 in FIG. 19) being associated with the position of the lattice determined in (Step 6) that a keypoint is visible are acquired from data of a relative position of each keypoint. Thereby, only a relative position of each person at each visible keypoint is acquired.

(Step 8): A position (P2 in FIG. 19) of each visible keypoint within a processing image is determined by using the center of the lattice determined in (Step 2) and the data acquired in (Step 7). Thereby, a position of each person within the processing image at each visible keypoint is determined.

(Step 9): A lattice (P4 in FIG. 20) in which each keypoint (P5 in FIG. 20) is located (included) is determined based on data of a likelihood of a position of a keypoint. Specifically, a lattice whose likelihood is equal to or more than a threshold value is determined.

(Step 10): A correction amount (P6 in FIG. 20) being associated with the position of the lattice determined in (Step 9) is acquired from the data of a correction amount of a position of a keypoint.

(Step 11): Based on the position (including the center position of the lattice) of the lattice determined in (Step 9) and the correction amount acquired in (Step 10), a position (P5 in FIG. 20), within the processing image, of each keypoint included in the processing image is determined.

(Step 12): The position of a keypoint within the processing image of each person acquired in (Step 8) and the position of the keypoint within the processing image acquired in (Step 11) are associated with the same type of a keypoint being at a near distance (e.g., a keypoint whose distance is equal to or less than a threshold value), the position of the keypoint within the processing image of each person acquired in (Step 8) is corrected by integration of the associated positions, and, thereby, a position, within the processing image, of each of a plurality of visible keypoints of each person in the processing image is computed. As a method of integration, averaging, weighted averaging, selection of one of them, and the like are exemplified.

Since a position of each keypoint within the processing image computed in (step 12) and a position of a lattice indicating a position of a person are associated in (step 8), it can be recognized which person a position of each computed keypoint within the processing image is associated with. Moreover, in (step 7), only the data being associated with a position of a lattice in which a keypoint is determined to be visible in (step 6) are acquired, but data may be acquired including a position of a lattice determined to be invisible.

Figure 24:
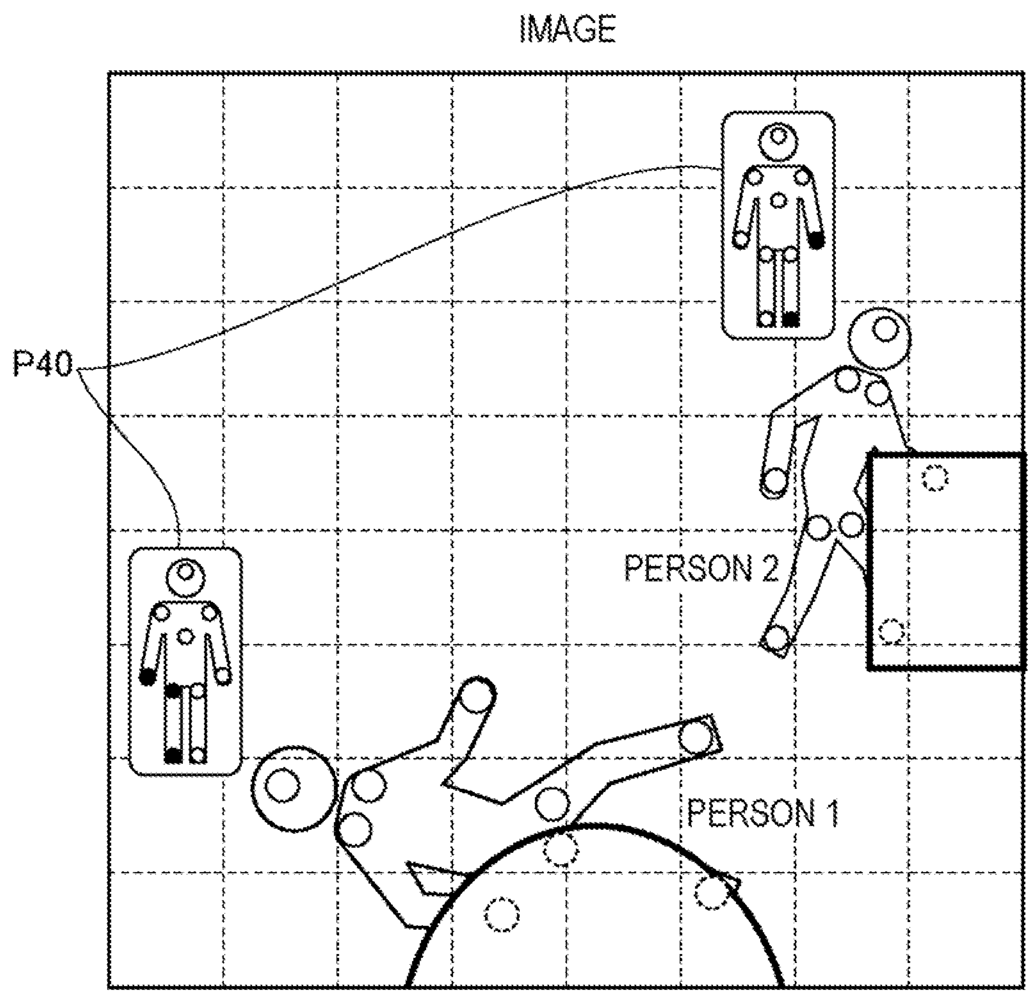
FIG. 24 is a diagram for describing the technique according to the present example embodiment.

Note that, the estimation unit 21 may or may not estimate a position, within a processing image, of each of a plurality of invisible keypoints of each person within the processing image. When no estimation is performed, a type of an invisible keypoint is recognized for each person, and, therefore, it is possible to output information thereof (a type of an invisible keypoint) for each person. Further, as indicated by P40 in FIG. 24, it is also possible to represent a type of an invisible keypoint for each person as an object modeled on a person and display the type for each person.

When estimation is performed, for example, the following can be considered as processing for estimating. The estimation unit 21 determines a visible keypoint that is directly connected to an invisible keypoint, based on a previously defined connection relation of a plurality of keypoints to a person. Then, the estimation unit 21 estimates a position of an invisible keypoint within the processing image, based on a position, within the processing image, of a visible keypoint that is directly connected to the invisible keypoint. Details thereof vary, and can be achieved by utilizing every possible technique.

Moreover, a position of an estimated invisible keypoint within a processing image can also be displayed as a range of a circle centered at the position. A position of an estimated invisible keypoint within a processing image is actually an approximate position, and is therefore a display method that can represent this. A range of a circle may be computed based on a spread of a position of a keypoint being associated with a person to whom the keypoint belongs, or may be fixed. In addition, a position of an estimated visible keypoint within a processing image is accurate, and may therefore be displayed by an object (a point, a figure, or the like) that can indicate the position with one point.

Figure 21:
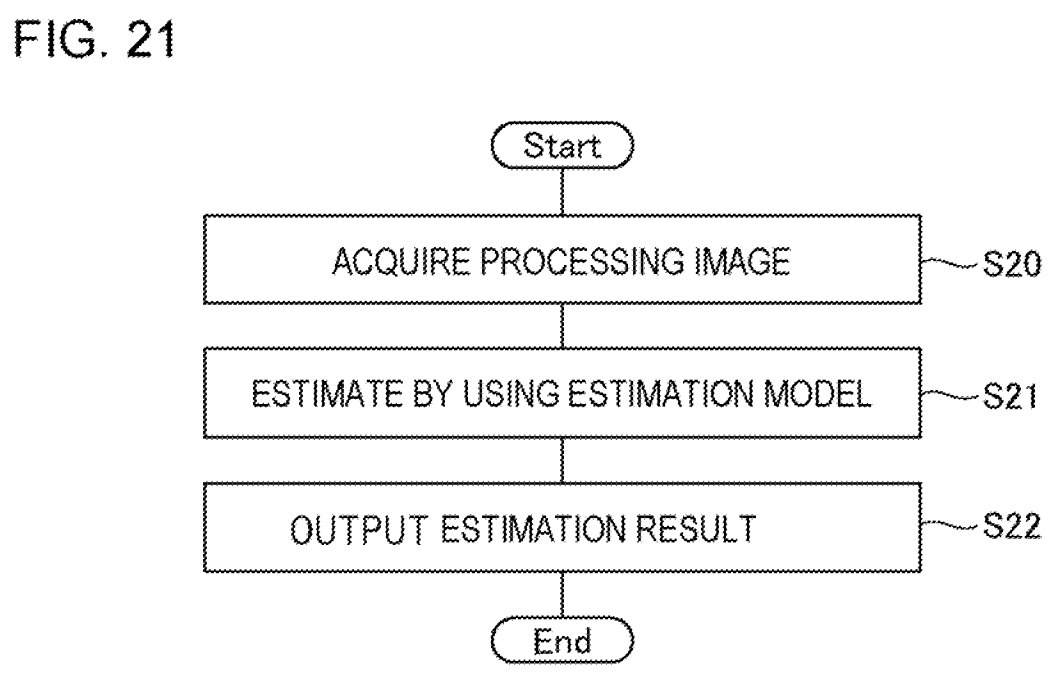

Next, one example of a flow of processing of the estimation apparatus 20 is described by using a flowchart in FIG. 21.

In S20, the estimation apparatus 20 acquires a processing image. For example, an operator inputs a processing image to the estimation apparatus 20. Then, the estimation apparatus 20 acquires the input processing image.

In S21, the estimation apparatus 20 estimates a position, within the processing image, of each of a plurality of keypoints of each person included in the processing image, by using an estimation model learned by the learning apparatus 10. The processing is achieved by the estimation unit 21. Details of the processing executed by the estimation unit 21 are as described above.

In S22, the estimation apparatus 20 outputs an estimation result of S21. The estimation apparatus 20 can utilize every possible means such as a display, a projection apparatus, a printer, and e-mail.

Next, one example of the hardware configuration of the estimation apparatus 20 is be described. Each functional unit of the processing apparatus 20 is achieved by any combination of hardware and software mainly including a CPU of any computer, a memory, a program loaded onto the memory, a storage unit such as a hard disk that stores the program (that can store not only a program previously stored from a phase of shipping an apparatus but also a program downloaded from a storage medium such as a CD or a server or the like on the Internet), and an interface for network connection. Then, it is appreciated by a person skilled in the art that there are a variety of modified examples of a method and an apparatus for the achievement.

FIG. 16 is a block diagram illustrating a hardware configuration of the estimation apparatus 20. As illustrated in FIG. 16, the learning apparatus 20 includes a processor 1A, a memory 2A, an input/output interface 3A, a peripheral circuit 4A, and a bus 5A. The peripheral circuit 4A includes various modules. The learning apparatus 20 may not include the peripheral circuit 4A. Note that, the learning apparatus 20 may be configured by a plurality of physically and/or logically separated apparatuses. In this case, each of a plurality of apparatuses can include the hardware configuration described above.

The estimation apparatus 20 according to the present example embodiment described above can estimate a position, within a processing image, of each of the plurality of keypoints of each person included in the processing image, by using an estimation model correctly learned by excluding information of a keypoint that is invisible in the image. Such an estimation apparatus 20 improves accuracy of the estimation.

MODIFIED EXAMPLES

Some modified examples are described below. The example embodiment described above can also have a configuration adopting one or a plurality of the following modified examples.

First Modified Example

An estimation unit 21 may compute and output, for each estimated person, information indicating a degree at which a body of a person is visible in a processing image, and a degree at which a body of a person is hidden in a processing image, based on at least one of the number of keypoints estimated to be visible in the processing image and the number of keypoints estimated to be invisible in the processing image, for each estimated person.

For example, the estimation unit 21 may compute a ratio of (the number of keypoints estimated to be visible in the processing image) to (a total number of keypoints) for each estimated person, as information indicating a degree at which a body of a person is visible in the processing image for each estimated person.

Otherwise, the estimation unit 21 may compute a ratio of (the number of keypoints estimated to be invisible in the processing image) to a (total number of keypoints) for each estimated person, as information indicating a degree at which a body of a person is hidden in the processing image for each estimated person.

Figure 22:
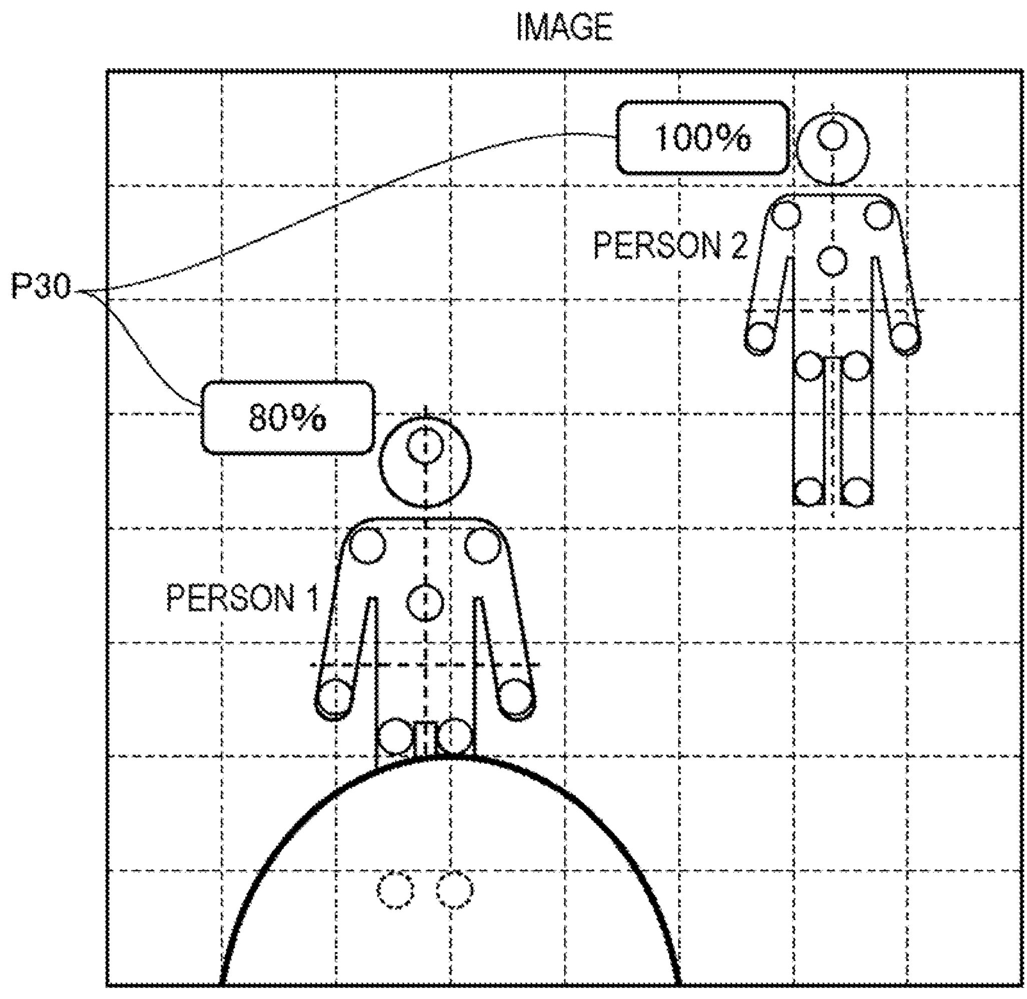
FIG. 22 is a diagram for describing the technique according to the present example embodiment.
Figure 23:
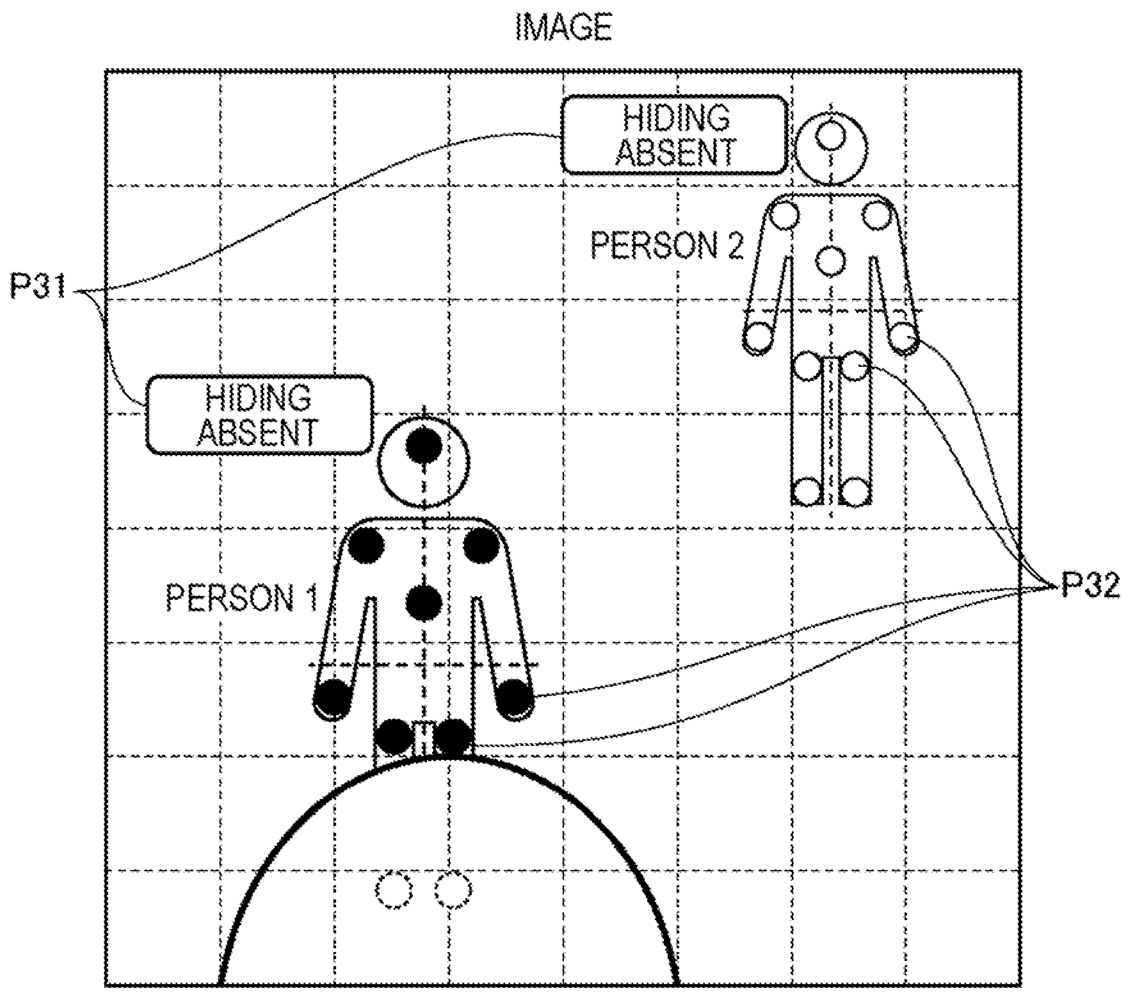
FIG. 23 is a diagram for describing the technique according to the present example embodiment.

The information (or ratio), illustrated above, indicating a degree to which a body is visible/invisible for each computed person may be displayed for each person, based on a center position of each person or a position of a specified keypoint, as illustrated in P30 in FIG. 22. Moreover, the information (or a ratio) may be converted into information indicating hiding absent/hiding present for each person, based on a specified threshold value, and the converted information may be displayed in a similar way to the above (P31 in FIG. 23). Further, a color/pattern may be assigned to information indicating hiding absent/hiding present for each person, and a keypoint on a person basis may be displayed in the color as indicated by P32 in FIG. 23.

Second Modified Example

An estimation model according to the example embodiment described above learns and estimates whether each of a plurality of keypoints of each person is visible in a processing image. As a modified example, instead of or in addition to the hiding information described above, the estimation model may further learn and estimate a hidden state of each keypoint that is invisible in the processing image. In the modified example, a hidden state of each keypoint that is invisible in the training image is further indicated in a correct answer label of learning data. A hidden state of an invisible keypoint can include, for example, a state of being located outside an image, a state of being located within an image but hidden by another object, and a state of being located within an image but hidden by an own part.

As one example of achieving the modified example, an example of adding the pieces of information to hiding information can be considered. For example, in the example embodiment described above, in hiding information, a value of "0" is given to a visible keypoint, and a value of "1" is given to an invisible keypoint. In a modified example, in hiding information, for example, a value of "0" may be given to a visible keypoint, a value of "1" may be given to a keypoint that is invisible due to a state of being located outside an image, a value of "2" may be given to a keypoint that is located within an image but invisible due to a state of being hidden by another object, and a value of "3" may be given to a keypoint that is located within an image but invisible due to a state of being hidden by an own part. Equal to or more than one piece of hiding information indicate an invisible keypoint.

Third Modified Example

An estimation model according to the example embodiment described above learns and estimates whether each of a plurality of keypoints of each person is visible in a processing image. As a modified example, instead of or in addition to hiding information described above, the estimating model may further learn and estimate a state of a way of overlapping of each keypoint that is invisible in a processing image, as the number of objects hiding the keypoint. In the modified example, in the correct answer label of learning data, a state of a way of overlapping of each keypoint that is invisible in a training image is further indicated as the number of objects hiding the keypoint.

As one example of achieving the modified example, an example of adding the pieces of information to hiding information can be considered. For example, in the example embodiment described above, in hiding information, a value of "0" is given to a visible keypoint, and a value of "1" is given to an invisible keypoint. In the modified example, in hiding information, for example, a value of "0" is given to a visible keypoint, and, to a visible keypoint, a value according to a number M of objects hiding the keypoint, for example, a value of "M" is given. Equal to or more than one piece of hiding information indicate an invisible keypoint.

Figure 25:
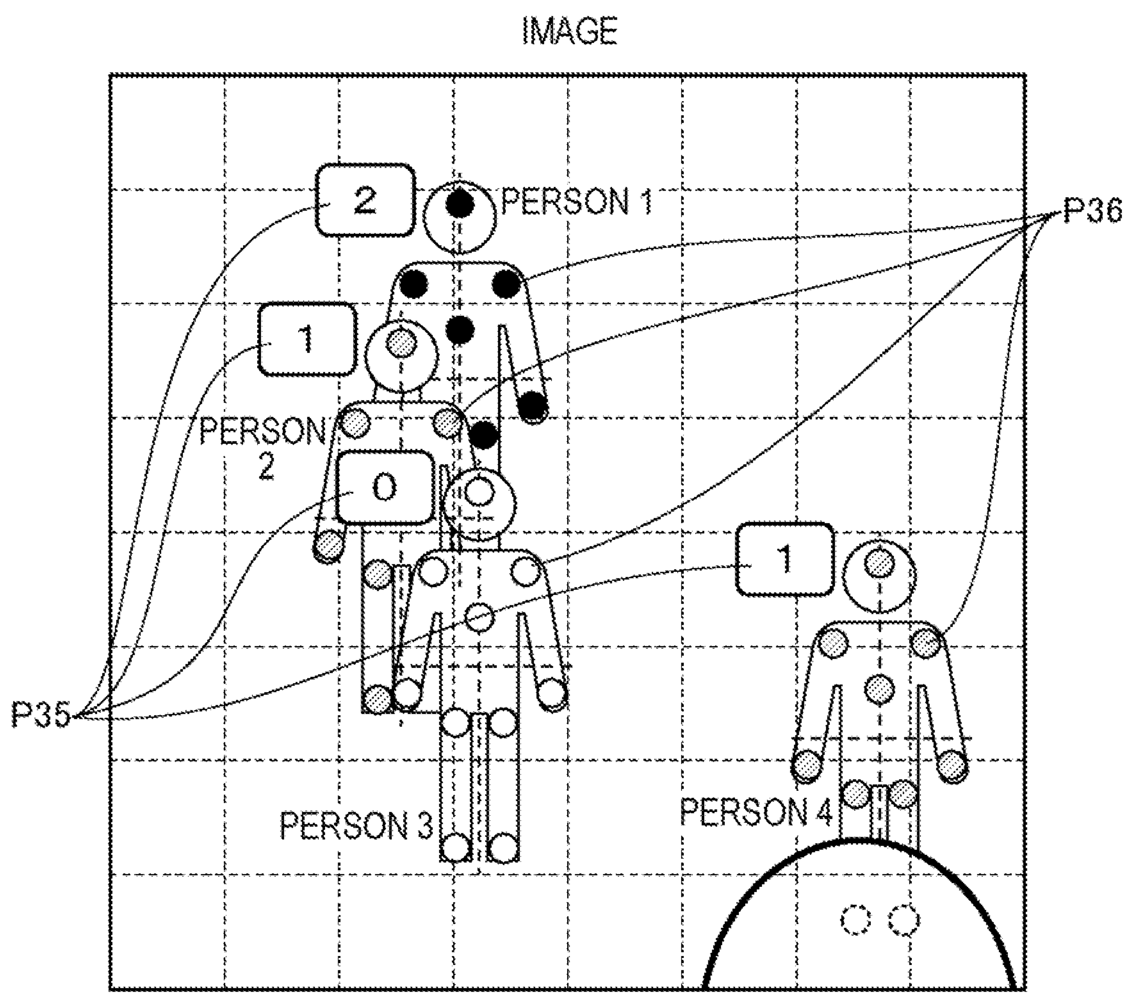
FIG. 25 is a diagram for describing the technique according to the present example embodiment.

In the number of objects hiding each keypoint for each person illustrated above, a maximum value is computed for each person, and the computed maximum value is computed as a state of a way of overlapping for each person. The computed state (or maximum value) of a way of overlapping for each person may be displayed for each person, based on a center position of each person or a position of a specified keypoint, as indicated by P35 in FIG. 25. Moreover, a color/pattern may be allocated to a state of a way of overlapping for each person, and a keypoint on a person basis may be displayed in the color as indicated by P36 in FIG. 25.

Since the number of objects hiding each keypoint for each person illustrated above, or the state (or maximum value) of a way of overlapping for each person illustrated above can be recognized, it is also possible to construct, based on the information, depth information on a person basis or a keypoint basis. The depth information illustrated herein indicates an order of distance from a camera.

Note that, the third modified example can also be combined with the second modified example.

The example embodiments of the present invention have been described above with reference to the drawings, but are exemplifications of the present invention, and various configurations other than those described above can also be adopted.

Note that, in the present description, "acquisition" includes at least one of "fetching, by a local apparatus, data stored in another apparatus or a storage medium (active acquisition)", for example, receiving by requesting or inquiring of the another apparatus, accessing the another apparatus or the storage medium and reading, and the like, based on a user input, or based on an instruction of a program, "inputting, into a local apparatus, data output from another apparatus (passive acquisition)", for example, receiving data given by distribution (or transmission, push notification, or the like), selecting and acquiring from received data or information, based on a user input, or based on an instruction of a program, and "generating new data by editing of data (conversion into text, rearrangement of data, extraction of partial data, changing of a file format, or the like) or the like, and acquiring the new data".

Some or all of the above-described example embodiments can also be described as, but are not limited to, the following supplementary notes.

1. A learning apparatus including:

an acquisition unit that acquires learning data associating a training image including a person with a correct answer label indicating a position of each person, a correct answer label indicating whether each of a plurality of keypoints of a body of each of the persons is visible in the training image, and a correct answer label indicating a position, within the training image, of the keypoint being visible in the training image among a plurality of the keypoints; and a learning unit that learns, based on the learning data, an estimation model that estimates information indicating a position of each person, information indicating whether each of a plurality of the keypoints of each person included in a processing image is visible in the processing image, and information being related to a position of each of keypoints for computing a position, within the processing image, of the keypoint being visible in the processing image.

2. The learning apparatus according to supplementary note 1, wherein, in the correct answer label, a position, within the training image, of the keypoint being invisible in the training image is not indicated.

3. The learning apparatus according to supplementary note 1 or 2, wherein the learning unit estimates, based on the estimating model being learned, information indicating a position of each person, information indicating whether each of a plurality of the keypoints of each person included in a processing image is visible in the processing image, and information being related to a position of each of keypoints for computing a position of each of the plurality of the keypoints within the training image, adjusts a parameter of the estimation model in such a way as to minimize a difference between an estimation result of information indicating a position of each person and information indicating a position of each person indicated by the correct answer label, adjusts a parameter of the estimation model in such a way as to minimize a difference between an estimation result of information indicating whether each of a plurality of the keypoints of each person included in the processing image is visible in the processing image, and information indicating whether each of a plurality of the keypoints of a body of each person indicated by the correct answer label is visible in the training image, and adjusts a parameter of the estimation model in such a way as to minimize a difference between an estimation result of information being related to a position of each of keypoints for computing a position of each of the plurality of the keypoints within the training image, and information being related to a position of each of keypoints acquired from a position, within the training image, of the keypoint being visible in the training image among a plurality of the keypoints indicated by the correct answer label, for only a keypoint being visible in the training image indicated by the correct answer label.

4. The learning apparatus according to any one of supplementary notes 1 to 3, wherein the correct answer label further indicates a state of each of the invisible keypoints for each person in the training image, and the estimation model further estimates the state of each of the invisible keypoints for each person in the processing image.

5. The learning apparatus according to supplementary note 4, wherein the state includes a state of being located outside an image, a state of being located within an image but hidden by another object, and a state of being located within an image but hidden by an own part.

6. The learning apparatus according to supplementary note 4, wherein the state indicates a number of objects hiding the keypoint being invisible in the training image or the processing image.

7. An estimation apparatus including an estimation unit that estimates a position, within a processing image, of each of a plurality of keypoints of each person included in the processing image, by using an estimation model learned by the learning apparatus according to any one of supplementary notes 1 to 6.

8. The estimation apparatus according to supplementary note 7, wherein the estimation unit estimates, by using the estimation model, whether each of a plurality of the keypoints of each person included in the processing image is visible in the processing image, and estimates, by using a result of the estimation, a position, within the processing image, of each of a plurality of keypoints for each person included in the processing image.

9. The estimation apparatus according to supplementary note 8, wherein the estimation unit outputs a type of an invisible keypoint for each person, by using the estimated information as to whether each of the plurality of keypoints of each person included in the processing image is visible in the processing image, or represents a type of the invisible keypoint as an object modeled on a person and displays the object for each person.

10. The estimation apparatus according to supplementary note 8 or 9, wherein the estimation unit determines an invisible keypoint, by using the estimated information as to whether each of a plurality of the keypoints of each person included in the processing image is visible in the processing image, determines a visible keypoint being directly connected to the determined invisible keypoint, based on a previously defined connection relation of a plurality of keypoints to a person, and estimates a position of the determined invisible keypoint in a processing image, based on a position of the determined visible keypoint within a processing image.

11. The estimation apparatus according to any one of supplementary notes 7 to 10, wherein the estimation unit computes information indicating, for each estimated person, at least one of a degree at which a body of a person is visible in the processing image, and a degree at which a body of a person is hidden in the processing image, based on at least one of a number of the keypoints estimated to be visible in the processing image and a number of keypoints estimated to be invisible in the processing image, with respect to each estimated person.

12. The estimation apparatus according to supplementary note 11, wherein the estimation unit displays, for each person, information indicating at least one of the computed degree at which a body of a person is visible, and the computed degree at which a body of a person is hidden, based on a center position of each person or a specified keypoint position.

13. The estimation apparatus according to supplementary note 11, wherein the estimation unit converts, into information indicating hiding absent/hiding present for each person, based on a specified threshold value, information indicating at least one of the computed degree at which a body of a person is visible, and the computed degree at which a body of a person is hidden, and displays the converted information for each person, based on a center position of each person or a specified keypoint position.

14. The estimation apparatus according to supplementary note 7, wherein the estimation unit computes a maximum value for each person in a number of the objects hiding each keypoint for each person, computes the computed maximum value as a state of a way of overlapping for each person, and displays, for each person, the computed state of a way of overlapping for each person, based on a center position of each person or a position of a specified keypoint, or allocates a color/pattern to a state of a way of overlapping for each person, and displays a keypoint on a person basis in the allocated color.

15. A learning method of executing, by a computer:

an acquisition step of acquiring learning data associating a training image including a person with a correct answer label indicating a position of each person, a correct answer label indicating whether each of a plurality of keypoints of a body of each of the persons is visible in the training image, and a correct answer label indicating a position, within the training image, of the keypoint being visible in the training image among a plurality of the keypoints; and a learning step of learning, based on the learning data, an estimation model that estimates information indicating a position of each person, information indicating whether each of a plurality of the keypoints of each person included in a processing image is visible in the processing image, and information being related to a position of each of keypoints for computing a position, within the processing image, of the keypoint being visible in the processing image.

16. A program causing a computer to function as:

an acquisition unit that acquires learning data associating a training image including a person with a correct answer label indicating a position of each person, a correct answer label indicating whether each of a plurality of keypoints of a body of each of the persons is visible in the training image, and a correct answer label indicating a position, within the training image, of the keypoint being visible in the training image among a plurality of the keypoints; and a learning unit that learns, based on the learning data, an estimation model that estimates information indicating a position of each person, information indicating whether each of a plurality of the keypoints of each person included in a processing image is visible in the processing image, and information being related to a position of each of keypoints for computing a position, within the processing image, of the keypoint being visible in the processing image.

17. An estimation method of executing, by a computer, an estimation step of estimating a position, within a processing image, of each of a plurality of keypoints of each person included in the processing image, by using an estimation model learned by the learning apparatus according to any one of supplementary notes 1 to 6.

18. A program causing a computer to function as an estimation unit that estimates a position, within a processing image, of each of a plurality of keypoints of each person included in the processing image, by using an estimation model learned by the learning apparatus according to any one of supplementary notes 1 to 6.

REFERENCE SIGNS LIST

10 Learning apparatus
11 Acquisition unit
12 Learning unit
13 Storage unit
20 Estimation apparatus
21 Estimation unit
22 Storage unit
1A Processor
2A Memory
3A Input/output I/F
4A Peripheral circuit
5A Bus

What is claimed is:

1. A learning apparatus comprising:

at least one memory configured to store one or more instructions; and at least one processor configured to execute the one or more instructions to:

acquire learning data associating a training image including at least one person with a correct answer label indicating a position of each of the at least one person, a correct answer label indicating whether each of a plurality of keypoints of a body of each of the at least one person is visible in the training image, and a correct answer label indicating a position, within the training image, of a keypoint being visible in the training image among a plurality of the keypoints; and learn, based on the learning data, an estimation model that estimates information indicating a position of each of the at least one person, information indicating whether each of a plurality of the keypoints of each of the at least one person included in a processing image is visible in the processing image, and information being related to a position of each of keypoints for computing a position, within the processing image, of the keypoint being visible in the processing image, wherein the estimation model does not output the information being related to a position of each of the keypoints for computing a position, within the processing image, regarding a subset of the plurality of keypoints indicated to be invisible in the information indicating whether each of the plurality of the keypoints of each of the at least one person included in the processing image is visible in the processing image.

2. The learning apparatus according to claim 1, wherein, in the correct answer label, a position, within the training image, of the keypoint being invisible in the training image is not indicated.

3. The learning apparatus according to claim 1, wherein the at least one processor is further configured to execute the one or more instructions to estimate, based on the estimation model being learned, information indicating a position of each of the at least one person, information indicating whether each of a plurality of the keypoints of each of the at least one person included in the processing image is visible in the processing image, and information being related to a position of each of keypoints for computing a position of each of the plurality of the keypoints within the training image, adjust a first parameter of the estimation model in such a way as to minimize a difference between an estimation result of information indicating a position of each of the at least one person and information indicating a position of each of the at least one person indicated by the correct answer label, adjust a second parameter of the estimation model in such a way as to minimize a difference between an estimation result of information indicating whether each of a plurality of the keypoints of each of the at least one person included in the processing image is visible in the processing image, and information indicating whether each of a plurality of the keypoints of a body of each of the at least one person indicated by the correct answer label is visible in the training image, and adjust a third parameter of the estimation model in such a way as to minimize a difference between an estimation result of information being related to a position of each of keypoints for computing a position of each of the plurality of the keypoints within the training image, and information being related to a position of each of keypoints acquired from a position, within the training image, of the keypoint being visible in the training image among a plurality of the keypoints indicated by the correct answer label, for only a keypoint being visible in the training image indicated by the correct answer label.

4. The learning apparatus according to claim 1, wherein the correct answer label further indicates a state of each invisible keypoint for each of the at least one person in the training image, and the estimation model further estimates the state of each of the invisible keypoints for each of the at least one person in the processing image.

5. The learning apparatus according to claim 4, wherein the state includes a state of being located outside an image, a state of being located within an image but hidden by another object, and a state of being located within an image but hidden by an own part.

6. The learning apparatus according to claim 4, wherein the state indicates a number of objects hiding the keypoint being invisible in the training image or the processing image.

7. An estimation apparatus comprising:

at least one memory configured to store one or more instructions; and at least one processor configured to execute the one or more instructions to:

estimate a position, within a processing image, of each of a plurality of keypoints of each of the at least one person included in the processing image, by using an estimation model learned by the learning apparatus according to claim 1.

8. The estimation apparatus according to claim 7, wherein the at least one processor is further configured to execute the one or more instructions to estimate, by using the estimation model, whether each of a plurality of the keypoints of each of the at least one person included in the processing image is visible in the processing image, and estimate, by using a result of the estimation, a position, within the processing image, of each of a plurality of keypoints for each of the at least one person included in the processing image.

9. The estimation apparatus according to claim 8, wherein the at least one processor is further configured to execute the one or more instructions to;

output a type of an invisible keypoint for each of the at least one person, based on the estimate whether each of the plurality of keypoints of each of the at least one person included in the processing image is visible in the processing image, or represent a type of the invisible keypoint as an object modeled on a person and display the object for each of the at least one person.

10. The estimation apparatus according to claim 8, wherein the at least one processor is further configured to execute the one or more instructions to:

determine an invisible keypoint, based on the estimate as to whether each of a plurality of the keypoints of each of the at least one person included in the processing image is visible in the processing image, determine a visible keypoint being directly connected to the determined invisible keypoint, based on a previously defined connection relation of a plurality of keypoints to a person, and estimate a position of the determined invisible keypoint in the processing image, based on a position of the determined visible keypoint within the processing image.

11. The estimation apparatus according to claim 7, wherein compute information indicating, for each estimated person, at least one of a degree at which a body of a person is visible in the processing image, and a degree at which a body of a person is hidden in the processing image, based on at least one of a number of the keypoints estimated to be visible in the processing image and a number of keypoints estimated to be invisible in the processing image, with respect to each estimated person.

12. The estimation apparatus according to claim 11, wherein the at least one processor is further configured to execute the one or more instructions to display, for each of the at least one person, information indicating at least one of the computed degree at which a body of a person is visible, and the computed degree at which a body of a person is hidden, based on a center position of each of the at least one person or a specified keypoint position.

13. The estimation apparatus according to claim 11, wherein the at least one processor is further configured to execute the one or more instructions to:

convert, into information indicating hiding absent or hiding present for each of the at least one person, based on a specified threshold value, information indicating at least one of the computed degree at which a body of a person is visible, and the computed degree at which a body of a person is hidden, and display the information indicating hiding absent or hiding present for each of the at least one person, based on a center position of each of the at least one person or a specified keypoint position.

14. The estimation apparatus according to claim 7, wherein the at least one processor is further configured to execute the one or more instructions to:

compute a maximum value for each of the at least one person in a number of objects hiding each keypoint for each of the at least one person, compute the computed maximum value as a state of a way of overlapping for each of the at least one person, and display, for each of the at least one person, the computed state of a way of overlapping for each of the at least one person, based on a center position of each of the at least one person or a position of a specified keypoint, or display a keypoint on a person with a color corresponding to a state of a way of overlapping for each of the at least one person.

15. An estimation method of executing, by a computer, estimating a position, within a processing image, of each of a plurality of keypoints of each of the at least one person included in the processing image, by using an estimation model learned by the learning apparatus according to claim 1.

16. A non-transitory storage medium storing a program causing a computer to:

estimate a position, within a processing image, of each of a plurality of keypoints of each of the at least one person included in the processing image, by using an estimation model learned by the learning apparatus according to claim 1.

17. A learning method executed by a computer, the method comprising:

acquiring learning data associating a training image including at least one person with a correct answer label indicating a position of each of the at least one person, a correct answer label indicating whether each of a plurality of keypoints of a body of each of the at least one person is visible in the training image, and a correct answer label indicating a position, within the training image, of the keypoint being visible in the training image among a plurality of the keypoints; and learning, based on the learning data, an estimation model that estimates information indicating a position of each of the at least one person, information indicating whether each of a plurality of the keypoints of each of the at least one person included in a processing image is visible in the processing image, and information being related to a position of each of keypoints for computing a position, within the processing image, of the keypoint being visible in the processing image, wherein the estimation model does not output the information being related to a position of each of the keypoints for computing a position, within the processing image, regarding a subset of the plurality of keypoints indicated to be invisible in the information indicating whether each of the plurality of the keypoints of each of the at least one person included in the processing image is visible in the processing image.

18. A non-transitory storage medium storing a program causing a computer to execute instructions, the instructions comprising:

acquire learning data associating a training image including at least one person with a correct answer label indicating a position of each of the at least one person, a correct answer label indicating whether each of a plurality of keypoints of a body of each of the at least one person is visible in the training image, and a correct answer label indicating a position, within the training image, of the keypoint being visible in the training image among a plurality of the keypoints; and learn, based on the learning data, an estimation model that estimates information indicating a position of each of the at least one person, information indicating whether each of a plurality of the keypoints of each of the at least one person included in a processing image is visible in the processing image, and information being related to a position of each of keypoints for computing a position, within the processing image, of the keypoint being visible in the processing image, wherein the estimation model does not output the information being related to a position of each of the keypoints for computing a position, within the processing image, regarding a subset of the plurality of keypoints indicated to be invisible in the information indicating whether each of the plurality of the keypoints of each of the at least one person included in the processing image is visible in the processing image.

* * * * *